(12) United States Patent
Heller et al.

(10) Patent No.: US 8,527,482 B2
(45) Date of Patent: Sep. 3, 2013

(54) METHOD FOR REDUCING REDUNDANCY BETWEEN TWO OR MORE DATASETS

(75) Inventors: Steve Heller, Dike, TX (US); Ralph Shnelvar, Boulder, CO (US)

(73) Assignee: Chrysalis Storage, LLC, Tyler, TX (US)

( * ) Notice: Subject to any disclaimer, the term of this patent is extended or adjusted under 35 U.S.C. 154(b) by 414 days.

(21) Appl. No.: 12/455,864

(22) Filed: Jun. 8, 2009

(65) Prior Publication Data

US 2009/0307251 A1    Dec. 10, 2009

Related U.S. Application Data

(60) Provisional application No. 61/059,276, filed on Jun. 6, 2008.

(51) Int. Cl.
*G06F 17/30* (2006.01)

(52) U.S. Cl.
USPC .......................................................... 707/699

(58) Field of Classification Search
USPC .................. 707/699, 698, 664, 747
See application file for complete search history.

(56) References Cited

U.S. PATENT DOCUMENTS

| | | | | |
|---|---|---|---|---|
| 5,479,654 | A * | 12/1995 | Squibb | 707/695 |
| 5,990,810 | A * | 11/1999 | Williams | 341/51 |
| 6,507,847 | B1 * | 1/2003 | Fleischman | 707/704 |
| 6,839,650 | B2 * | 1/2005 | Sutton et al. | 702/123 |
| 7,788,239 | B2 * | 8/2010 | Scholl et al. | 707/695 |
| 2002/0083033 | A1 * | 6/2002 | Abdo et al. | 707/1 |
| 2007/0255758 | A1 * | 11/2007 | Zheng et al. | 707/200 |
| 2008/0159331 | A1 * | 7/2008 | Mace et al. | 370/473 |
| 2008/0294696 | A1 * | 11/2008 | Frandzel | 707/200 |

OTHER PUBLICATIONS

Mandagere, N., Zhou, P., Smith, M. A., & Uttamchandani, S. (Dec. 2008). Demystifying data deduplication. In Proceedings of the ACM/IFIP/USENIX Middleware'08 Conference Companion (pp. 12-17). ACM.*

Lelewer, D. A., & Hirschberg, D. S. (1987). Data compression. ACM Computing Surveys (CSUR), 19(3), 261-296.*

\* cited by examiner

*Primary Examiner* — Usmaan Saeed
*Assistant Examiner* — Nan Hutton
(74) *Attorney, Agent, or Firm* — Knobbe, Martens, Olson & Bear, LLP

(57) ABSTRACT

A method for reducing redundancy between two or more datasets of potentially very large size. The method improves upon current technology by oversubscribing the data structure that represents a digest of data blocks and using positional information about matching data so that very large datasets can be analyzed and the redundancies removed by, having found a match on digest, expands the match in both directions in order to detect and eliminate large runs of data by replace duplicate runs with references to common data. The method is particularly useful for capturing the states of images of a hard disk. The method permits several files to have their redundancy removed and the files to later be reconstituted. The method is appropriate for use on a WORM device. The method can also make use of L2 cache to improve performance.

18 Claims, No Drawings

METHOD FOR REDUCING REDUNDANCY BETWEEN TWO OR MORE DATASETS

I. CROSS REFERENCE TO RELATED APPLICATIONS

This application claims the benefits of U.S. Provisional Patent Application No. 61/059,276 filed Jun. 6, 2008, which is incorporated by reference herein.

II. FIELD OF THE INVENTION

This invention relates generally to a system and method for storing data. More particularly, this invention relates to a form of data size reduction which involves finding redundancies in and between large data sets (files) and eliminating these redundancies in order to conserve repository memory (generally, disk space).

III. BACKGROUND OF THE INVENTION

This invention relates generally to a system and method for storing data. More particularly, this invention relates to storing data efficiently in both the time and space domains by removing redundant data between two or more data sets.

The inventors of this invention noticed that there are many times when very large datasets are created by users in which there is a great deal of commonality between and among the datasets. In some cases, for instance, there may be more than 99% of common data between these datasets and these datasets may share long runs of identical data although the data may be in different locations in the datasets and/or there may be relatively small insertions and deletions of data. Some, non-exhaustive, examples of when such commonalities occur are described, below.

The method of this invention attempts to find the common "long runs of data" and use this information to remove this redundancy so as to save repository space.

As an example of when commonalities occur, datasets on the order of tens of gigabytes or larger are commonly created as the products of modern backup operations on computers. Maintaining multiple versions of such datasets consumes a great deal of disk space, so that only a relatively few, if any, versions are, generally, kept. However, since the contents of each version of a backup for the same machine have a great deal in common with the contents of the other versions, it should be possible to reduce the total storage required significantly. In many cases this could allow the retention of hundreds or thousands or more of versions in the space now occupied by a dozen or so.

In a typical single-computer environment, the computer has an active Repository that contains information of importance to the owner of the computer. In order to preserve this information (data) from accidental loss or malicious deletion, one or more backups of the information is stored in one or more backup Repositories; such backups are kept in a dataset that is reified in one or more computer files.

Modern computers commonly use one of three types of Repositories: rotating-media-based, tape-based, and less commonly (as we write this in 2009) solid-state-memory-based. This Method applies to disk-based and solid-state-memory-based Repositories although, theoretically, this method can apply to tape-based backups; as those familiar with the art understand, a Turing machine, using only sequential storage, can emulate a disk-based machine.

Users of this Method will find this method particularly efficacious when used with Repositories with the hardware property of "read many, write many" or "read many, write few" or "read many, write once".

Modern disk drives are almost always of the type "read many, write many". Modern disk drives also have the undesirable property that random seeks take milliseconds of time.

Modern solid-state memory has the undesirable properties of being far more expensive per byte than disk-based memory as well as (with some types of solid-state memory) limiting the number of rewrites before the device fails to be rewriteable. It has the desirable property that random seeks in the device's memory may be computationally almost cost free in the time domain.

We will teach how our Method can be adjusted to take advantage of both disk-based memory as well as solid-state memory to take advantage of each kind of memory's particular performance characteristics.

One of the many ways to perform a backup is to take a so-called "Image Backup" of the Repository. In an Image Backup, the bit-pattern of the data in the Repository is stored somewhere so that—should it be necessary—the exact bit pattern of the original Repository can be recreated. This bit pattern is sometimes referred to as a Forensic Backup. A full Forensic Backup is independent of any operating system since all that is recorded is the bit pattern in the Repository. A full Forensic Backup need not "understand" the contents of the Repository.

Very often, the program that takes the Image Backup also knows which areas of the Repository have usable (that is, allocated) data and which areas are free to be used by an operating system to store new data.

A user's Repository is often broken up into logically contiguous areas known as partitions. Generally, during routine computer operation, only one operating system has access to any particular partition.

Operating systems are generally responsible for allocating space inside of a partition. Although an operating system might allocate space with variable length bit or byte allocations, generally, modern operating systems break up a partition into thousands to billions of fixed size pieces often called sectors. The industry has settled on a typical sector size of 512 bytes. A group of one or more logically contiguous sectors is often called a cluster. The operating system often has a bit map of one-bit-per-cluster indicating which clusters have been allocated to users by the operating system and which are free to be allocated; in some Microsoft systems this bit map is called the File Allocation Table (FAT). Files that have been deleted will often have the corresponding bits associated with the file changed in the allocation table from allocated to free.

The method we teach is not sensitive to the mechanism used for tracking allocated and free space.

The internal data structures that determine which data is allocated or unallocated are operating system dependent. Thus the program that is doing the backup must be aware of the particular operating system's so-called allocation map (data structure, e.g. FAT) if it is to not copy unallocated space to the backup repository. Backup programs normally depend on the dual facts that there are only a handful of commonly used operating systems and that the operating systems leave clues at the beginning of disk partitions or in a so-called Partition Table as to what internal data structure (e.g. FAT, FAT32, NTFS, HPFS, etc.) a particular partition is formatted for.

Unallocated space on a computer's disk generally has a (more-or-less-random) bit pattern but that bit pattern is generally of little use to the owner of the computer's disk. Unallocated data might, for instance, be space associated with page files or deleted files. The backup program could (and often does) optionally only back up the allocated data. Nonetheless, this is still considered an Image Backup of the data in the Repository.

In the alternative, backup programs are written in such a manner that they ask for the assistance of the operating system to fetch files from the Repository and store those files in a backup dataset(s).

Modern computers typically use disk drives as their main Repository.

Because computer hardware and software fail and, in particular, because disk drives fail, it is the wise custom to take and keep several backups of the Repository. A modern, circa 2009, typical business or home user's computer's disk drives have storage on the order of magnitude of 500 gigabytes of which about half is used. These are typical figures but the actual values vary greatly.

Assuming the typical values, above, an image backup will consume about 250 gigabytes if the data is uncompressed. The size of the backup will likely be reduced roughly another thirty percent if the backup program compresses the data. The aforementioned thirty percent will vary depending on the user's underlying data as well as the compression algorithm. Compression above fifty percent for typical allocated data is unusually high. At a backup speed of approximately thirty megabytes a second, an Allocated Image backup of the Repository will take about an hour. The backup speed will vary depending on many factors including whether the user is backing up the disk to another disk, the speed of the disk, the speed of the processor in its ability to compress raw data, etc.

Because users of computers accidentally delete files or their computers become infected by computer viruses, users often wish to retain multiple backups over time. Sometimes these same users wish to maintain multiple backups using proprietary formats from multiple backup software vendors.

At current 2009 prices, 1000 gigabytes of disk storage costs about $100. Thus, an unsophisticated backup scheme of uncompressed 250 gigabytes (125 gigabytes compressed) would cost the user about $12 for each backup, quickly limiting the number of backups the user maintains. This invention will allow the user to maintain many versions of the backups by eliminating redundancies between and among the backups.

As those familiar with the art understand, limiting factors in removing redundancy include but are not limited to (a) random access speed, and (b) the amount of RAM available to maintain tables representing the data for which redundancy is to be eliminated.

IV.1 Other Applications of the Method

While the previous discussion focused on image-based backups, this Method is not limited to that scenario.

There are many other times in which two large files will have a great deal of the kind of commonality described, above.

For instance, it is quite likely that, say, file-oriented backups of a customer database will have a great deal of commonality across time. There tend to be many customers who have no activity between backups and those customers who do have activity generally have a small number of transactions to be recorded.

This Method applies to such scenarios and datasets, as well.

V. SUMMARY OF THE INVENTION

V.(1) Summary—Efficacy of the Invention

This invention relates generally to a system and method for storing data. More particularly, this invention relates to a form of data size reduction that involves finding redundancies in and between large data sets (files) and eliminating these redundancies in order to conserve repository memory (generally, disk space).

As currently implemented prior to this invention, the random access memory (RAM) requirements to remove redundancies in, say, a pair of multi-terabyte files, exceed the capacity of most modern home computers and de-duplicating appliances. This Method vastly reduces the RAM requirements to remove much of the duplicate data between these two files as well as removing duplicate data within the files themselves.

V.(2) Summary—Definition of Local Information

To make our teaching in this Summary of the Invention somewhat easier, we define "Local Information" to mean a range of a large file that is significantly smaller than the size of said file.

Thus, if we are positioned at byte 5,000,000,000,000 in a seven-terabyte file, the fuzzy notion of Local Information might be several kilobytes, or several hundred megabytes, or several gigabytes of data on either side of said 5,000,000,000,000 position.

V.(3) Summary—Kinds of Compression and Data Deduplication

With some kinds of data, such as still pictures, audio, and video, data size reduction algorithms can take advantage of the fact that the human eye and ear have limited ability to distinguish certain features of visual or sonic data. For this reason, these types of data can be reduced in size in a lossy way; that is, the original data cannot be recovered exactly bit for bit, but the consumer of the data finds the alterations acceptable.

However, when dealing with other types of data, such as data processing documents, spreadsheets, or backup datasets, it is vital that any method of size reduction applied to these data be completely and perfectly reversible to recover the exact original information. Thus, we must use lossless data size reduction methods with such data.

There are currently two main categories of lossless size reduction: compression and deduplication.

Lossless compression—as distinct from deduplication—could be defined as a method that uses Local Information to determine how to represent a given subset of data in a more efficient manner. Examples of this include Huffman encoding and LZW coding, both of which have been described in detail in public documents.

Deduplication could be defined as a method that uses non-local information to determine how to avoid storing the same content twice. For example, if the data for an email program is hosted on a server, and a particular email message is sent out to many people on the same server, the server can maintain one copy of that email message rather than keeping one copy for each recipient, as the message is known to be the same for each recipient. This particular kind of deduplication is known as single instance storage, and is limited in scope because very few applications exist where entire files (in this case, email messages) are identical and can thus be stored once; furthermore this is easier to do in the email case because the server is aware of the fact that the files are identical without having to examine them. More general deduplication approaches search for identical fragments of one or more files and represent those fragments by storing only one copy of the original fragment and using references to that original fragment to replace the other copies of that fragment.

There is no reason not to combine compression and deduplication to further reduce the amount of storage needed to represent a given dataset, and indeed this is commonly done.

This Invention is a method of data deduplication that reduces the amount of main storage (RAM) required to deduplicate large files by a significant ratio. This ratio can be in excess of 30-1 over the more conventional approach.

V.(4) Summary—Setting up the Conditions for the Example We Teach

Assume that we have two files:
(FileX) A roughly one-terabyte file representing a year-to-October-$1^{st}$ email backup
(FileY) A slightly larger one-terabyte file representing a year-to-October-$2^{nd}$ email backup.

Clearly FileY is somewhat larger than FileX because it includes the emails that came in one day after the FileX-backup was taken.

For convenience, we call FileX the Reference File; and FileY the Current File.

V.(5) Summary—Deduplication Using the Current Art. Processing the Reference File and Creating the Hash Table The following is an oversimplification of the current art. We do so to teach the current art in order to compare it to the novelty of the Inventors' new Method.

Prior to this Invention, those familiar with the current art would do the following: FileX (the Reference File) would be broken up into fixed-sized blocks. We will use 512-byte blocks for our example, but it is common to use larger blocks such as 8192-byte blocks in the current art so as to reduce the memory requirements for the hash table, although this will reduce the efficiency of the deduplication process. (See Section XI.)

For each 512-byte block, a hash (hash is a synonym for "digest") is created. The hash is almost always a small fraction of the size of the block: If the hash is computed using the well-known CRC64 algorithm, the size of the hash would be 8 bytes. That is, the 512-byte block is represented in a field in some table, typically a hash table, by a much-more manageable 8-byte quantity.

For convenience in teaching the art, we assume that all implementers of the current art use hash tables.

Each entry in the hash table will contain the hash value and a block number (or, equivalently, the byte position) indicating which block in the current file is represented by that particular hash (i.e. digest value), There may be other items in each entry in the hash table, but for purposes of this summary, we assume that each entry in the table only consists of the hash value and the block number in the current file.

If
1. the algorithm used to create hashes is, for instance, the well-known CRC64, and
2. the block number is an 8-byte quantity then each entry in the hash table will be 16 bytes: eight for the CRC64 and eight for the block number.

If the block size is 512 bytes and we are populating a hash table for the one-terabyte FileX, then the hash table size will need to be approximately 32 gigabytes in size.

This 32 gigabytes is computed as follows: in a terabyte file, there are approximately two billion 512-byte contiguous non-overlapping blocks. Each hash table entry is sixteen bytes long; hence a compact hash table would need to be 32 gigabytes in size.

This 32 gigabytes of RAM for the hash table substantially exceeds the size of RAM that can be supported on a typical modern (circa June 2009) home computer.

As those who are familiar with the art know, hash tables become very inefficient when they get more than about 30% full. Thus, the real amount of RAM necessary to properly support FileX using 512-byte blocks would reasonably exceed 100 gigabytes. Even using 8192-byte blocks would still require over 6 gigabytes just for the hash table given the 30%-full capacity constraint.

V.(6) Summary—Deduplication Using the Current Art. Processing the Current File, Accessing the 32-Gigabyte Hash Table, and Bookkeeping For each 512-byte block, in FileY (i.e. the Current File), the hash code is calculated and the hash table created for FileX is searched for a matching hash value. If there is a match then the underlying 512-byte block from FileX is read and compared to the 512-byte block currently being processed in FileY; and if the underlying 512-byte blocks in FileX and FileY (i.e. the Reference and Current Files, respectively) match, then a reference to the block in FileX is made and the duplicate data in FileY (i.e. the Current File) is noted by the bookkeeping done by conventional method of the prior art and the new Method that we teach. If there is no match, then this is new data; and this new data is noted by the bookkeeping done by both the conventional method of the prior art and the new Method that we teach.

No matter what bookkeeping is used to keep track of matching and non-matching data, we teach that there is—in our example, above—approximately a 100-gigabyte hash table.

V.(7) Summary—Deduplication Performance of the Preferred Embodiment of this Invention; Part I Before we teach the new art of the Invention, it is useful to note that the Inventors have observed that in actual use of the implementation of the Preferred Embodiment of the Invention, that it is not unusual to remove 95% of the duplicate data between the Reference File and the Current File.

V.(8) Summary—Deduplication Using the New Art 100 gigabytes of RAM for a hash table is a large resource in order to support deduplication of FileX and FileY. The Inventors' Method substantially reduces this 100 Gigabyte resource requirement.

The essential novelty of the Invention is that we teach that it is not necessary to store a hash table entry for each 512-byte block; but, instead, that the hash table can be oversubscribed in such a way that only a fraction of the hash table entries generated by the conventional method need appear in the hash table.

An astute reader would ask, "If one does not store every hash table entry, how can one possibly remove 95% of the duplicates as was taught in V(7)?"

The answer is that there is extra information in the Reference and Current Files that is not being exploited by the current art. The Inventors' novel Method exploits this information.

The extra information that this Invention exploits that the current art does not exploit is that we examine local information (See V(2)) for runs of identical data.

Let us make this clear with an extreme example.

We slightly modify the conditions we set up in V(4) by assuming that the one-terabyte Reference File and the Current File are identical. That is, FileX and FileY are identical.

Further, assume that we limit the size of the hash table to a single entry and that the position selected for the hash entry is for position 549,755,813,888 (=$2^{39}$) in the Reference File; that is, roughly halfway into the Reference File but at a block position divisible by 512.

Note that for this example, any 512-byte-block position would work equally well.

We now initially perform exactly the same set of operations that we taught in V(6) except that the size of the hash table is no longer 32 gigabytes but is, instead, only the size of a single table entry: 16 bytes.

We initially repeat the operations we taught in V(6).

For each 512-byte block, in FileY (i.e. the Current File), the hash code is calculated and the hash table (which now only contains a single entry) created for FileX is searched for a matching hash value. For purposes of this explanation, assume that there is no match of the hash values until we have processed 1,073,741,824 blocks in the Current File; thus reaching byte position 549,755,813,888.

At byte position 549,755,813,888 we now read a 512-byte block and we know that we will have a hash value match because, by definition, the Reference and Current files are identical and identical data generates identical hash value matches.

We now read the 512-byte block at byte position 549,755,813,888 in the Reference File because that is the block of data that the hash table is pointing to for that hash value.

Again we know that the two blocks will compare equal; by definition of this example.

We now deviate from the current art. This is the "Aha!" moment.

At this point we would read backwards sequentially from position 549,755,813,888 in both the Reference and Current Files looking for a mismatch. Because the Reference and Current Files are identical, no mismatches would be found. Once beginning-of-file is detected (or, in the more realistic example, a mismatch was detected), the Method we teach would then seek to position 549,755,813,888+512 and read forwards until a mismatch was detected or end-of-file was detected. Of course, no mismatches would be detected.

The bookkeeping that will be done in the Preferred Embodiment of the Inventor's Method would indicate that starting at byte 0 in the Current File that there was a terabyte of matching information starting at byte 0 in the Reference File.

Thus, in the conditions we specified in V(4), a terabyte of identical information would be reduced to a handful of bytes equivalent to the bookkeeping entry that stated that "starting at byte 0 in the Current File, there was a terabyte of matching information starting at byte 0 in the Reference File".

A more typical example of a bookkeeping entry might look something like "At byte 614400 in the Current File there is a run of 307200 bytes that is identical to data that can be found at position 921600 in the Reference File."

What makes this new Method efficacious is that the Inventors have noticed that in the class of files of interest (e.g. backup files of large systems separated by some length of time such as in our example of V(4)) that there are very long runs of identical data that happen to be in different places in the two files.

By "randomly" probing the Reference File with only a subset of hash values—say one out of every 32 512-byte blocks—and using this backwards-and-forwards (or, equivalently, forwards-and-backwards) searching to find long runs of data, one can drastically reduce the number of hash table entries and still achieve 95% or better data deduplication.

V.(9) Summary—Definition of the Subscription Ratio

We define the "subscription ratio" of the hash table as the ratio of the number of blocks in the reference file whose hash code has been computed, to the capacity of the hash table. For example, if the Reference File consists of 1000 blocks but the hash table has a capacity of 100 entries, then the oversubscription ratio would be 10:1, regardless of whether the hash table has one or more open entries after all the entries for the reference file have been processed.

To explicate this further by an extreme example of a degenerate case,

1. If the Reference File consists of 1000 blocks of all binary 1's and
2. The hash table has a capacity of 100 entries then all the hash codes would be identical and would be indexed into the same hash table entry since all the hash codes would be calculated using blocks with identical contents.

Thus 99 out of 100 hash table entries would be unused. Nonetheless, the Subscription Ratio as we define it would still be 10:1 because the relative sizes of the number of blocks versus the limiting size of the hash table is 10:1.

V.(10) Summary—Deduplication Performance of the Preferred Embodiment of this Invention; Part II As those who are familiar with the art readily understand, one wants to minimize the size of the blocks for which hash values are computed while maximizing the number of entries in the hash table in order to get fine-grained probes of the Reference File. The larger the block size, the more likely that a run will not be detected. This will be further explained in the specification in Section XI.

The Method we teach produces high deduplication efficiency (often up to 20-1; higher deduplication performance will be achieved with highly similar data in the Current and Reference Files) with oversubscription ratios of 30 to 1 or more, allowing us to use small (e.g., 512 byte) blocks even for 200+ GB files while consuming only 128 MB of RAM.

The Method we teach also scales well. Unlike the methods used by practitioners of the current art, our Method will continue to work gracefully but with lesser deduplication efficiency no matter how large the files become. That is, there is no precipitous drop-off in performance as the Reference or Current Files grow in size or the number of table entries in the hash table shrinks.

As for speed circa June 2009, we can achieve input processing rates up to the 10-15 MB/sec range on inexpensive commodity computers with two SATA drives, depending of course on the amount of duplication in the files and how large the Reference File becomes. SSD drives provide roughly the same maximum speed but the speed is not as dependent on the size of the Reference File.

V.(11) Summary—What about Insertions and Deletions?

An astute reader might ask, "This works well for data that is always identical at 512-byte boundaries. But what if there was an insertion or deletion of a byte at the very beginning of the Current File? That is, what if the Current File is identical to the Reference File except that the Current File is one byte longer than the Reference File because a byte has been added to the beginning of the Current File? Doesn't that remove the identicalness of the digests and thus it would be unlikely that any digest matches would be found and thus there would be almost no deduplication?"

The answer we teach is not in this Summary. The novel Method we teach, below, easily handles this insertion or deletion of a byte. See Sections XXI and XXIII(4), below.

DETAILED DESCRIPTION OF THE INVENTION

VI. DEFINITIONS

Bit: On most computer architectures, individual bits do not have an address and it takes software to access a particular bit. Nonetheless, this is well understood by those familiar with the art.

Byte: Most modern computers organize information into eight-bit bytes. Bytes are usually addressable directly by hardware. The term is well understood by those familiar with the art.

Reference: Some means of identifying an object. Pointers, names, block number, byte offsets, etc., are various means of referring to data. The term is well understood by those familiar with the art.

Run: Two arrays of bytes that are identical. A Run can occur at two positions in the same file or in different files. One of the objectives of the Inventors' Method is to take Runs of bytes and eliminate the redundancy between them by replacing one of the arrays with a reference. The term is well understood by those familiar with the art.

Run Length (RL): The number of bytes that represents the length of the Run.

User Option: Those familiar with the art understand that there are innumerable ways for users to select how a program may operate. The selection may be as simple as clicking on a check box or as complicated as setting a physical switch somewhere across the world or in outer space. Sometimes a user will select an option such that the program will use one or more of a multitude of strategies and heuristics to modify its behavior. Often an option will be selected because the user knows more about the data coming in than the program does and selecting the proper option can optimize the software's behavior. This term is well understood by those familiar with the art.

Compile-time Parameter: A value that is specified at compile-time. An example of a compile time parameter might be the maximum length of a text-string that the user can enter at run time. As those familiar with the art understand, many Compile-time Parameters are more-or-less easily converted to User Options. This term is well understood by those familiar with the art.

Deduplication: The removal of duplicate data by replacing one or more Runs with a reference to a single copy of the Run or a reference to an algorithm that can generate the Run. This term is well understood by those familiar with the art.

File: An ordered sequence of bytes generally known by a name and managed by an Operating System. This term is well understood by those familiar with the art.

Close: When performed on a file, a Close operation is the last operation performed on a file before Operating System resources are freed for that file. This term is well understood by those familiar with the art.

Chapter: We use a very similar definition of Chapter to that used in U.S. Pat. No. 6,374,266. We define Chapter to mean the collection of data necessary to logically or physically recreate the state of file at a point in time. Chapters are stored in an Extended Reference File (ERF) the definition of an ERF can be found in this section, below. The concept of a Chapter is further explained in section XXXV.

Reference File: A base or old File for which there exists a newer or different version. While the authors have not coined this phrase (see, for instance http://eurosvs.org/blog/?p=15, incorporated by reference herein), the phrase is not well-known by those familiar with the art. The word "reference" to mean "pointer" as defined above will be in lower case in this specification. The words "Reference File" will have their initial letters upper case in order to distinguish the usage of the two senses of the word "reference."

Current File: A (typically newer) version of a Reference File. The terms "Reference File" and "Current File" are terms of convenience since the two files may be unrelated. For the method we teach to be efficacious (that is, to remove data redundancy), the sum of Run Lengths between the Current and Reference File should be a substantial fraction of the size of the Current or Reference File.

EOF: End Of File. This is a position representing the number of bytes in a file. More usually it is a byte position in a byte-oriented file after the last byte of the file. If the file is 100 bytes in length, then EOF is 100 when using C-style zero-based file positioning. EOF is a term of art is well understood by those familiar with the art.

Current File Pointer (CFP): A pointer to a position in the Current File. This pointer is used and updated as the Current File is scanned from beginning to EOF.

Output Packets: As the Current File is compared against the Extended Reference File (see the next definition), the Method will create some bookkeeping entries that indicate, for instance, where there is duplication of data; or an algorithm that can generate data. A typical example of the first kind of bookkeeping entry might look something like "At byte 614400 in the Current File there is a run of 307200 bytes that is identical to data that can be found at position 921600 in the Reference File." Another example of the second kind of bookkeeping entry might be "At byte 102400 in the Current File there is an array of length 1057 bytes of zeros." These bookkeeping entries are structured into Output Packets of various lengths. Those familiar with the art understand that there are many ways to structure the Output Packets.

Extended Reference File (ERF): In the Preferred Embodiment, the Output Packets are appended to the Reference File. This need not be done. As those who are familiar with the art understand, the Output Packets could be stored nearly anywhere: In a separate file or files, on another computer in a network, or even stored somewhere in so-called cloud storage. If Output Packets are appended to the Reference File as is done in the Preferred Embodiment, then ERF is a term of convenience since once the Output Packets have finished being appended to the Reference File, the Extended Reference File becomes the Reference File for the next Current File. Every time that a Current File is deduplicated and a set of Output Packets representing a new Current File are added to an Extended Reference File, a new Chapter is created. One of the many possible structures of an ERF can be found in Section XXVII. The Inventors have coined this definition.

Adding a file: There may be many Current Files that are processed one after another to create many Chapters in an Extended Reference File. We define this process of adding Output Packets to the Extended Reference File as "Adding a file." This process is similar to, say, adding a file to a zip file.

Reconstituting a Current File: There may be many Current Files that are "added" to the Extended Reference File. Reconstituting the file means rebuilding the Current File of interest from the data within the Extended Reference File. This process of reconstituting a file is similar to extracting a file from a zip file.

Repository: A place where data is stored in, generally, a non-volatile manner. Typical Repositories are disk drives, tape drives, memory sticks, etc. When we use the term Repository we generally mean disk drive although the Method applies to other implementations of Repositories.

Intrafile Compression: The repeated use of Local Information to reduce the size of a file. A common example of this is the well-known zip file algorithm. This kind of compression is well understood by those familiar with the art.

Intrafile Duplication: If a single file has two different positions in the same file in which there is a Run, then we say that there is Intrafile Duplication.

Interfile Duplication: If two different files have one or more Runs, then we say that there is Interfile Duplication.

Intrafile Deduplication: The process of removing some or all duplicate data within a file by analyzing the entire file for duplicate data. Our Method is one of many methods to perform Intrafile Deduplication.

Delta Compression: A collection of techniques well known to those familiar with the art that creates a file (a so-called Patch File, Difference File, or Delta File; three synonyms for the same thing) that when appropriately combined with a Reference File can recreate a Current File. This term is well understood by those familiar with the art.

Patch File: A file that, when appropriately combined with some other file, crates a third file. See Delta Compression, immediately above. This term is well understood by those familiar with the art.

Image Backup: A file that represents the state of a computer's Repository (or portion, thereof) at a moment in time. Typically this is a sector-by-sector (i.e. a bit-by-bit) copy of the computer's hard disk. This term is well understood by those familiar with the art.

Forensic Image Backup: A backup in which an entire source Repository is copied bit-by-bit to a backup repository so that the state of the entire source Repository is captured and preserved. This term is well understood by those familiar with the art.

Allocated Image Backup: A file, or files, or (backup) Repository representing the state of a computer's hard disk at a moment in time. Typically this is a sector-by-sector (i.e. a bit-by-bit) copy of the computer's hard disk in which the backup program knows which sectors have been allocated by the various Operating Systems using the computer's Current Repository (e.g. disk drive) and only those sectors are copied to the target Repository. This term is well understood by those familiar with the art.

Current Repository: A place where data is stored in a nonvolatile manner that is generally accessible to a computer's current operations. This is a term of logical convenience.

Backup Repository: A place where backup data is stored in a nonvolatile manner that is generally logically inaccessible to a computer's current operation. This is a term of logical convenience since some users of computers can keep their backup data permanently accessible and modifiable.

Operating System: A computer program that, typically, provides an interface between general software and the hardware on which the general programs run. Examples are Microsoft Windows, Linux, Mac OS, and Unix. This concept is well understood by those familiar with the art.

Reversible Digest: A piece of data or an algorithm that can uniquely recover the original data from which it came. A non-exhaustive set of examples of reversible digests would be (1) An algorithm to generate fifteen bytes of zeros in a row; (2) an LZW compression of 512 bytes; (3) the original data itself; (4) Reversing the bytes of an array. For a fuller explanation of the term, see Section XXIII. The Inventors have coined this definition.

Digest: A possibly small piece of data that represents a larger piece of data. Often the digest is a hash code (e.g. CRC, MD5) of a larger piece of data. This concept is well understood by those familiar with the art. "Digest" and "hash code" are synonyms and are often used interchangeably. This term is well understood by those familiar with the art although, for the purposes of this specification, the Inventors use the phrase slightly differently from the generally accepted meaning because we use the term to mean either a hash code or a reversible digest.

Digest Entry Data (DED): A data structure comprising a digest (e.g. a hash) plus other data necessary and/or convenient to identify where the raw data came from. In the Preferred Embodiment, "where the data came from" is a byte offset in the Extended Reference File (ERF). For convenience and computational efficiency, the DED may contain more than a single digest (as well as other data). In the Preferred Embodiment, the DED contains a computationally expensive CRC64 as well as a computationally inexpensive "Rolling Hash." In a hash table, the DED would be a hash table entry. In the Preferred Embodiment, the DED is a hash table entry. For those familiar with the art, the fields of the DED could be spread out among multiple tables. For instance, if the DED comprises the following three fields (1) A CRC64, (2) A Rolling Hash, and (3) A position in the ERF, then (except for performance) it is computationally equivalent to place these three fields into, say, separate arrays. In whatever manner these fields are stored, the collection of fields is a DED. The Inventors have coined this definition although the concept is well understood by those familiar with the art.

Matching-DED: A Digest Entry Data (DED) may have one or more Digests as fields. For instance, in the Preferred Embodiment, the DED has two Digests: a CRC64 and a Rolling Hash. If a particular DED has a Digest that matches a particular value, then we say that the DED is a Matching-DED. Note that the match is on the Digest values and not necessarily on the underlying data in any file.

Key: A key is a field in a database that a program can use to select records; in our case the records are DEDs. This concept is well understood by those familiar with the art.

Hash Index: A transformation of a hash code value that becomes an index. For instance, assume that a hash table has 100 entries that that the hash being used is a CRC16. CRC16 will generate a hash code value between 0 and 65535. One simple way to convert the hash code from 0-65535 to a range of 0-99 is to simply take the CRC16 value and use the value modulus 100. As another example, assuming that the hash table has 256 elements, then all one needs to do is use the bottom eight bits of the hash code value to provide a convenient index into the table. As another example, assuming that the hash table has 256 elements, then all one needs to do is use any eight bits of the hash code value to provide a convenient index into the table.

Digest Data Structure (DDS): A data structure (typically, a hash table) that contains a collection of DEDs collected from an Extended Reference File (ERF) (see definition of ERF, above). In general, the DDS is a data structure that is stored separately from the ERF. In the Preferred Embodiment, the DDS is stored as a separate file. Indeed, if needed, the DDS can be recreated from a Reference File. The Inventors have coined this definition.

Digest Data Structure Hash Count (DDSHC): The number of DEDs that a DDS is currently storing. The Inventors have coined this definition.

Digest Data Structure Maximum Hash Count (DDSMHC): The number of hash values that a DDS could theoretically store given the amount of RAM and/or other resources available. If the DDS is a hash table then the DDSMHC is the number of entries in the hash table array. The Inventors have coined this definition.

Database Mapping Engine (DBME): A generic name for any algorithm that will store and/or fetch a key/keys and a value/values. Keys and values are well-understood terms for those familiar with the art. Often, it is conceptually easier to think of giving the DBME a key (e.g. a CRC64) and let the DBME convert the key from a hash value to a hash index. The Inventors have coined this definition.

n-byte-block: In the Preferred Embodiment, an n-byte block is a contiguous block of RAM memory or disk storage of 512 bytes. In the current Preferred Embodiment, the size of the n-byte-block is a Compile-time Parameter. Those familiar with the art understand that this Compile-time Parameter size of 512 bytes could, more or less, be easily converted into a User Option. The n-byte block has no particular alignment. The Inventors have coined this definition.

N-bytes: the number of bytes in an n-byte-block. In the Preferred Embodiment this is 512. The Inventors have coined this definition.

variable-length-n-byte-block (VLNBB): Similar to an n-byte-block but where the number of bytes is not of fixed length. The implementation of variable-length-n-byte-blocks in the Method is explained in section XLII. The Inventors have coined this definition. The concept should be well understood by those familiar with the art.

variable-length-n-byte-block-length-table (VLNBBLT): This is a table of unique lengths of variable-length-n-byte-blocks (VLNBBs). For example, if there are 100 VLNBBs computed for a Reference File and of those 100, 99 have a length of 512 bytes and one has a length of 8K bytes, then the variable-length-n-byte-block-length-table will have two entries: (1) a value of 512, and (2) a value of 8K. The Inventors have coined this definition.

N-variable-length-n-byte-block-length-table (NVLNBBLT): This is the number of entries in the variable-length-n-byte-block-length-table (VLNBBLT). For example, if there are 100 VLNBBs computed for a Reference File and of those 100, 99 have a length of 512 bytes and one has a length of 8K bytes, then the value of N-variable-length-n-byte-block-length-table will be 2. The Inventors have coined this definition.

NN: The (possibly non-integer) number of contiguous non-overlapping n-byte-blocks in a Current and/or Reference File (as appropriate in the context of the discussion). Where NN is non-integer then the reader should round this value up or down to an integer—as appropriate or convenient—if the context of the discussion warrants it. The Inventors have coined this definition.

B-byte-block: In the Preferred Embodiment, a B-byte-block is a contiguous block of RAM memory of 256K bytes. The B-byte-block has no particular alignment and can be larger or smaller than 256K. In the Preferred Embodiment, the size is a Compile-Time Parameter but those familiar with the art recognize that this value may be dynamically selected depending on available system resources such as available RAM or the size of the B-byte-block could be set as a User Option. Additionally, the size may be computed dynamically so as to maximize system I/O throughput.

BN: Size, in bytes, of the B-byte-block.

BB: The number of (possibly non-integer) B-byte-blocks in a Current and/or Reference File (as appropriate in the context of the discussion). Where BB is non-integer then the reader should round this value up or down—as appropriate or convenient—to an integer if the context of the discussion warrants it. The Inventors have coined this definition.

Subscription Ratio (SR): The ratio of the number of n-byte-blocks in a Current and/or Reference File (as appropriate in the context of the discussion) to the DDSMHC. That is, NN divided by DDSMHC. A fuller explanation of the SR can be found at V.(9). The Inventors have coined this definition.

Oversubscription: A Subscription Ratio (SR) greater than 1.0.

Undersubscription: An SR less than 1.0.

Plug-in: A piece of computer code that can be provided by the user to perform operations generally too complex to be provided as a User Option. For instance, the well known web browser, Firefox, allows third parties to provide plug-ins in order to extend the capability of the browser. The term is well understood by those familiar with the art.

Reference File DED Storage Strategy (RFDSS): Because the DDS is oversubscribed so that it is quite likely that there will be more hash code values than there is room in the DDS to store all the DEDs associated with the hash code indices, there needs to be some strategy to select which DEDs to insert and which to ignore. Perhaps the simplest strategy is to use the Subscription Ratio (SR) rounded to the nearest integer such that for every SRth n-byte-block being emitted to the ERF there would be a DED generated and that that DED be inserted into the DDS. Another possibility is to allow the user to write a plug-in in order to select which DEDs will be inserted into the DDS. The Inventors have coined this definition.

Extended Reference File DED Storage Overwrite Strategy (ERFDSOS): Because the DDS is oversubscribed, as new Output Packets are generated and new n-byte blocks of data are logically appended to the Extended Reference File (ERF), a strategy needs to be used to determine when to overwrite older DEDs. There are many strategies that can be used to determine when to replace older elements in the DDS with newer DEDs representing newly created Output Packets. Several strategies will be explained in XXXIII.(5). Perhaps the simplest strategy is to use the Subscription Ration (SR) rounded to the nearest integer such that for every SRth n-byte-block being emitted to the ERF there would be a DED generated and that that DED be inserted into the DDS. Another simple strategy would be to have a user option specify an integer value, K, that would be used instead of SR. Note that the ERFDSOS can be the same or different than the RFDSS. Another possibility is to allow the user to write a plug-in in order to select which DEDs will be inserted into the DDS. The distinction between the ERFDSOS and the RFDSS is minor: The RFDSS is used when the DDS is initially empty and the ERFDSOS is used when there is an existing DDS that was previously created and is likely full of DEDs. The Inventors have coined this definition.

Natural Language: A human language such as English, French, or Japanese.

Computer Language: A term well understood by those familiar with the art. A few examples are C++, FORTRAN, COBOL, C#, PL/I. Often, computer languages are well-defined by ANSI and/or ISO standards. This term is well understood by those familiar with the art.

Flow Chart: is a term familiar to those familiar with the art of computer programming. It is a schematic representation of a program and/or algorithm. This term is well understood by those familiar with the art.

Edge Condition: is a term familiar to those familiar with the art of computer programming. It is a condition that occurs "relatively rarely" while a program is running and represents a complication that must be handled. Some of the many possible Edge Conditions are: (a) End-of-file, (b) zero elements in an array, (c) one element in an array, (d) end-of-program cleanup, (e) I/O errors. Edge conditions can introduce a great deal of complexity to computer programs. When explaining the essence of an algorithm, edge conditions are often left out in order to make the understanding of the algorithm easier. This term is well understood by those familiar with the art.

Pseudocode: is a term familiar to those familiar with the art of computer programming. It is a textual representation of a program and/or algorithm that loosely uses the, typically structural, conventions of many programming languages, but omits many of the details of a specific computer language-specific syntax, generally written in a Natural Language. It is often easier for those familiar with the art to understand an algorithm if presented using Pseudocode rather than either a detailed computer program written in a Computer Language or a Flow Chart. Typically, Edge Conditions are often ignored when writing Pseudocode when the purpose is to teach the central concepts of an algorithm or a Method. This term is well understood by those familiar with the art.

Page: A section of computer memory that may be in RAM or on disk. This term is well understood by those familiar with the art.

Page Fault: If a program requests a Page of memory that happens not to be in high-speed RAM then a Page Fault occurs. Typically, the operating system will attempt to bring the section of memory in from slower-but-cheaper non-RAM (typically, disk-based) storage. On disk-based devices this usually involves a time-expensive seek operation followed by a read operation. This term is well understood by those familiar with the art.

Working Set: The set of all Pages (in a paging virtual memory system) used by a process during some time interval. This term is well understood by those familiar with the art.

Rolling Hash: A hash code that can be calculated as a recurrence; that is, as a function of an existing hash code and a few other data items. This contrasts with a non-Rolling Hash that must be recalculated from scratch for any change in the data. This term is well understood by those familiar with the art.

Good Hash: A Good Hash has certain desirable statistical properties having to do with the pseudo-randomness of the hash value as compared to the input. The current technology is such that a Good Hash is computationally expensive compared to a Rolling Hash. Examples of Good Hashes are CRC64, MD5, SHA, etc. The desirable properties of a Good Hash are well understood by those familiar with the art.

False positive: If one uses a digest (e.g. hash) with a fewer number of bits than the underlying data, then it is guaranteed that under some circumstances that the digests will match but the underlying data will not. This situation is called a false positive.

True positive: The opposite of a false positive; the underlying data matches. If one uses a digest (e.g. hash) with a fewer number of bits than the underlying data, then it is often true that the digests will match and the underlying data also matches.

Red-black tree: A data structure in which searches, insertions, and deletions are done in O(log n) time. This term is well understood by those familiar with the art.

Decoration: A block of data of interest is decorated when more data is added to the block in order to demarcate the block. Decorating a block is conceptually similar to placing a letter in an envelope. This term is well understood by those familiar with the art.

Packet: A block of data, generally transferred from one place to another. This term is well understood by those familiar with the art.

Matching Data Packet (MDP): A packet emitted to the Extended Reference File (ERF) representing a string of bytes for which data is being deduplicated. In an MDP there will be a reference to a position in the ERF as well as a length. The Inventors have coined this definition.

Literal Data Packet (LDP): A packet emitted to the Extended Reference File (ERF) representing an array of bytes for which there is no matching data that has been detected by the Method. The Inventors have coined this definition.

Zero Data Packet (ZDP): A packet emitted to the Extended Reference File (ERF) representing an array of bytes that have zeros as the contents of the bytes. The Inventors have coined this definition.

Algorithmic Data Packet (ADP): A packet emitted to the Extended Reference File (ERF) representing an array of bytes in which some algorithm is used to generate the data in the array of said bytes. A ZDP is a trivial example of an Algorithmic Data Packet. The Inventors have coined this definition.

Chapter Packet: A special packet that marks the end of a Chapter and is the last packet written before the Chapter is closed and the File is closed. Chapter Packets in the Extended Reference File are chained together so that one can find a preceding Chapter Packet from any Chapter Packet except the first one. The first Chapter Packet has a special "no preceding Chapter Packet" flag. The Inventors have coined this definition.

Reference File Analysis Phase (RFAP): The first of two major phases of operation of the Method we teach. In this phase of operation, the Method builds the DDS from data in the Reference File. The Inventors have coined this definition.

Current File Redundancy Elimination Phase (CFREP): The second of two major phases of operation of the Method. In this phase of operation, the Current File is examined and—using the DDS and the Extended Reference File—data redundancy is eliminated between the Reference File and the Current File. The Inventors have coined this definition.

Write Once Read Many (WORM): A device that has the physical characteristic that data written to media for this device cannot be erased. This term is well understood by those familiar with the art.

Write Fence: A position in a file or on a logically linear storage device that enforces a restriction on writing to the file or device prior to a certain point. A WORM device must know where the Write Fence is for a particular piece of medium. The sense of a Write Fence, though, is that some "meta" operation could reset the position of the Write Fence on, say, a disk drive simulating a WORM device thus allowing the rewriteable media in the disk drive to be reused.

Maximal Run Length (XRL): A Run, as measured in bits or bytes, as appropriate in context, of maximum possible length. The authors have coined this phrase.

Submaximal Run Length (SXRL): A Run, as measured in bits or bytes as appropriate in context, of less than or equal to the maximum possible length. The authors have coined this phrase.

Minimum Run Length (MRL): Since emitting a Run to the Extended Reference File may require decoration, the Minimum Run Length is a value in bits or bytes (as appropriate in context) that the Method may use to limit the emitting of Runs of a short Run Length in order to reduce the size of the Extended Reference File. The Minimum Run Length may be one bit or one byte as appropriate in context. The authors have coined this phrase.

First In First Out Queue: (FIFO). This term is well understood by those familiar with the art.

Last In First Out Queue: (LIFO). This term is well understood by those familiar with the art.

Temporary Literal Buffer (TLB): A buffer where literal data is accumulated. As the Current File is being processed sequentially, the Method will detect arrays of bytes that do not appear in the Extended Reference File. These bytes are accumulated in a Temporary Literal Buffer until matching data is detected. Among the ways a Temporary Literal Buffer could be implemented is as a LIFO or FIFO queue.

Current File Wall (CFW): Is a position in the Current File. As bytes are emitted to
    the Temporary Literal Buffer (TLB), or
    a Matching Data Packet (MDP) is emitted, or
    Literal Data Packet (LDP) is emitted, or
    An Algorithmic Data Packet (ADP) emitted, the Current File Wall is updated to a higher position in the Current File representing the highest position in the Current File emitted.

Expanding-The-Run: If we detect a short Run (say, of 512 bytes), then we wish to look at both sides of the Run to see if bytes continue to match. On the low-order side of the run, the expansion stops at the Current File Wall (CFW) or at the maximum count that the Run Length (RL) can maintain. At the high-order side of the Run, the run stops at EOF or at the maximum value that the RL can maintain. As those familiar with the art understand, the order in which one searches for a mismatch of bytes on either side is irrelevant. The concept is further explained in XXI.1. The Inventors have coined this phrase.

Expanded Run: The result of Expanding-The-Run. It is not necessary for the length of the Expanded Run to be the maximum possible Run Length (RL). The Inventors have coined this phrase.

Insertion/Deletion Algorithm: An algorithm that is able to look at two binary strings and detect and report insertions and deletions in one in order to produce the other. These algorithms are well known to those familiar with the art. For instance, as we write this, http://code.google.com/p/xdelta/ (incorporated herein by reference) is a link to open source to a program called xdelta that performs binary differences.

Magic Number: This is a bit pattern that is used to indicate or verify that correct data has been placed in a particular location. Generally, a Magic Number is a bit pattern that is expected rarely to be seen. This term is well understood by those familiar with the art.

Locality of Reference: Is a term of art that, roughly, means that computers can process data faster when the data to be processed is relatively compact along some relevant dimension. Thus, on a disk drive with a single head, data that is on a single track can be fetched faster than data on nearby tracks, which, in turn, can be processed faster than data on tracks that are farther away. Similarly, data in RAM that is mirrored in an L3, L2, or L1 hardware cache will be processed far faster than data that is not in these caches.

RAM Memory Hardware Cache (RMHC): In modern (circa 2009) computers, there is a small amount of very fast memory that the CPU can access. The L1 cache is, generally, physically on the CPU chip itself, and tends to be quite small; on the close order of 64K. The L2 cache (on the close order of 2 megabytes) tends to be intermediate in speed between RAM and the L1 cache.

DED Access Accelerator (DAA): This is a data structure that copies a portion of the Digest stored in each DED into a compact array that is small enough to fit into a cache (e.g. an L2 cache) that is faster than main RAM memory, in order to increase the performance of hash table lookups. This is more fully explained in XLIII. The Inventors have coined this phrase.

Proxy: When used in the context of the DED Access Accelerator (DAA), in the Preferred Embodiment, the one-byte Proxy is the low order byte of the Rolling Hash stored in the DED. It could, of course, be some other collection of bits of the Rolling Hash but a single byte is convenient. A nybble (4 bits) is another obvious size for a Proxy. The DM is an array of Proxies.

Proxy: Synchronizer: A program that performs deduplication.

VII. HOW DATA REDUNDANCY ELIMINATION BETWEEN TWO FILES IS CURRENTLY DONE

For small (on the order of 600 megabytes or smaller) datasets, a common technique to find the "difference" between two files is to use a "binary difference" program (e.g. Visual Patch from Indigo Rose Software). Techniques of this kind will generally eliminate redundancies at close to theoretical maximums.

Above that range, cruder commonality-removing (i.e. deduplication) techniques are used.

In general, to calculate a binary difference, the two input streams are logically broken up into logically contiguous equally sized blocks of data.

A digest (i.e. hash) is computed for each n-byte block in one of the files. If the hash is a so-called MD5 hash, the hash will occupy 32 bytes.

If the user has a gigabyte of RAM available—which is fairly typical for today's home computers—the user will be able to store roughly 30 million MD5 hashes. That is, the DDSMHC will be 30 million.

If N-bytes is 512 bytes then a DDS that is one gigabyte in size will be able to represent an input file of approximately 16 gigabytes in size. This is far smaller than the typical modern 2009 backup file size.

Once the hashes are calculated for each block in one of the files, the other file is examined and hashes are calculated for the blocks in that file. A matching hash indicates common data between the two files.

One could increase N-bytes but that reduces the likelihood that a match will be found. Similarly, one could reduce the size of the hash from 32 bytes to say, a 4-byte CRC but this has the undesirable effect of increasing the number of false positives.

VIII. PRIOR ART

Parts of this invention build on the technology of Shnelvar's patent U.S. Pat. No. 6,374,266. We make explicit note of U.S. Pat. No. 7,055,008 and state that while this invention may use stochastic (or in the alternate, heuristic) processes to determine if a block of data "is worthy of investigation to determine if the blocks are identical", this invention does not use the mechanisms as taught in U.S. Pat. No. 7,055,008. Indeed, for those devices with long seek times, we teach that we use stochastic processes on a collection of hash codes for blocks to determine if the computational expense of the delay associated with seeks is worthy of those blocks being fetched. Unlike U.S. Pat. No. 7,055,008, we do not assume that if two hash codes are identical that the underlying blocks are identical.

While this invention focuses on computer backups, it has applicability to the reduction in size of any two datasets as well as eliminating duplication in a dataset (Intrafile Deduplication). An objective of this Invention is not to require the reverse engineering of the internal structure of the backup files of backup software; or, indeed, of any software.

In order to understand the operation of the Invention, one should understand a point made at http://cis.poly.edu/~suel/ papers/delta.pdf (Algorithms for Delta Compression and Remote File Synchronization). Specifically, "delta compression" and "remote file synchronization" are quite different but related problems.

The present Invention relates to delta compression; but can be used for remote file synchronization. Indeed, it is one of the goals of this Invention that it be used for Remote File Synchronization.

To paraphrase what Suel and Memon wrote in Algorithms for Delta Compression and Remote File Synchronization:

"In the delta compression problem, a Client Computer has a copy of a Reference File and a Server Computer has copies of both the Reference and Current Files and the goal is to compute a Delta File of minimum size, such that the Client Computer can construct a Current File by manipulating the Reference File and the Delta File.

"In the remote file synchronization problem, the Client Computer has a copy of the Reference File and the Server only has a copy of the Current File and the goal is to design a protocol between the two parties that results in the Client Computer holding a copy of the Current File while minimizing the communication cost."

In the present invention it could be said that we turn some of Suel and Memon's definitions on their heads. (In actuality, we don't do that since which computer is the Client and which is the Server is a matter of convenience.) Specifically, in the class of problem that this invention addresses, we assume that the Client Computer contains both the Reference File as well as the Current File and the objective is to create a series of patch file(s) that represent the various states of the Current File at various previous times.

Given that there may be many clients being served by a server and that the computation of the Delta File will take on the order of several hours, it becomes clear that it would be wiser—for several reasons—to use the idle capacity of the clients rather than the servers to compute the Delta File(s).

There are other advantages to computing the Delta File on the Client rather than the server. A non-obvious advantage is that the client could then select a different imaging program at different times, thus providing a contingency against the possibility that a particular program is unable to restore the image it had created.

IX. A TYPICAL EXAMPLE

Consider a collection of files that represent daily Image Files of a particular client computer. For instance, consider the following, possibly typical, scenario of five daily Image Files that represent the state of a Client Computer on Monday through Friday.

On Monday a Monday Reference File is created.

On Tuesday the Tuesday Current File is created. The Client Computer then uses (possibly idle) system time to create a Tuesday Patch File that allows the Tuesday Current File to be created given the Monday Reference File and the Tuesday Patch File. A Verification Pass is then optionally performed to guarantee that the Tuesday Current File can be properly recreated from the Monday Reference File and the Tuesday Patch File. Then the Tuesday Current File is deleted in order to save disk space. The Tuesday Patch File is appended to the Monday Reference File to create a Tuesday Reference File.

In the Preferred Embodiment of our Method, the combination of the Monday Reference File and the Tuesday Patch File is called the Extended Reference File. We call the contents of the Monday Reference File "Chapter 1". We call the contents of Tuesday Current File as represented by the Monday Reference File plus the Tuesday Patch File "Chapter 2", etc.

In the Preferred Embodiment of the Invention, there is no separate Patch File. Instead, Output Packets are appended to a Reference File. As those familiar with the art understand, splitting out, say, the Tuesday Output Packets to form a Patch File is a trivial operation since the location of the Chapter's beginning position is stored in the last packet (the Chapter Packet) in the Extended Reference File.

On Wednesday a Wednesday Image File is created. The Client Computer then uses idle system time to create a Wednesday Patch File that allows the Wednesday Current File to be created given the Tuesday Reference File and the Wednesday Patch File. A Verification Pass is then performed to guarantee that the Wednesday Current File can be properly recreated from the Tuesday Reference File and the Tuesday Patch File. Then the Wednesday Current File is deleted in order to save disk space. The Wednesday Patch File is appended to the Tuesday Reference File to create a Wednesday Reference File.

The same for Image Files created on Thursday and Friday and for every day (or hour or minute or second) after that.

As those familiar with the art understand, whether the Patch Files are appended to the (Monday) Reference File or whether these files are saved individually is a trivial implementation detail. Whether the Patch Files are created using system idle time is an implementation detail. Whether the Current Files are deleted is an implementation detail. Whether a Verification Pass is performed is an implementation detail.

Indeed the Method of the current invention is not limited to image files but can easily be used for any collection of (large) databases and/or files.

The user of the present invention might find that it is efficacious to run backup program X on Monday and program Y on Tuesday so that the user is not relying on the ability of a single program to backup and restore the user's data. This is a major feature of the Method.

As users and administrators have learned from bitter experience, "Backup is easy. Restoring is hard."

X. SEEK AND YE SHALL FIND IT SLOWLY

As those familiar with the art understand, random access memory accesses in RAM are much faster than random access seeks followed by a read on disk.

Even with RAM, so-called "locality of reference" is a desired feature. Most modern CPUs will keep recently used data in a high-speed cache. As one of the authors of this Invention has noted in his book, *Efficient C/C++ Programming*, exploiting this feature of a CPU can dramatically increase the speed of operation of a computer program.

For purposes of simplicity, in this section we shall ignore+ the various hardware caches that most modern microprocessors possess and speak in broad terms.

Hard disk seek times, circa 2009, are measured on the order of milliseconds. 8 milliseconds is a fairly typical seek time, and this time has not changed for several years. See, for instance, http://www.storagereview.com/articles/200601/WD1500ADFD_3.html which is incorporated herein by reference. Assume for this discussion that there is a technological breakthrough and that a fast hard disk is capable of random access seeks that take "only" a millisecond.

Random access seeks in RAM are measured in nanoseconds. A fairly slow modern computer can do a non-localized seek in about 70 nanoseconds. Assume 100 nanoseconds for simplicity.

Thus, the ratio of random access seeking our very fast (currently, theoretical) hard disk to our relatively slow RAM is $10^{-3}/100 \times 10^{-9}$; which is ten thousand to one.

A more reasonable modern figure would be about a hundred thousand to one.

As those familiar with the art understand, if the comparison is between the situation where the disk drive's head is near the center of the drive and the data to be sought is towards the outer edge and the data is in a high-speed RAM cache because of locality of reference, then the ratio can be well in excess of a million to one.

In either event, the lesson that many others and we teach is that seeking on disk is to be avoided if at all possible if there are a large number of seeks to be performed because of the large cost in the time domain.

XI. N-BYTES: SMALLER IS USUALLY BETTER

One can view each n-byte-block as a probe into the Reference and Current Files. In order to find the maximum number of Runs, one wants to make N-bytes as small as possible.

To demonstrate this, assume that the Reference and Current Files have the following Contents:

Exhibit 1
Two files in which only the first byte is different

| | Offset in File | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Reference | A | B | C | D | E | F | G | H | I | J | K | L | M | N | O |
| Current | X | B | C | D | E | F | G | H | I | J | K | L | M | N | O |

XI.(1): In Our First Scenario, Assume that N-Bytes is 5.
When N-bytes is 5 then
bytes 0-4 do not match and the two hash codes for bytes 0-4 are not likely to match.
bytes 5-9 do match and the hash codes for bytes 5-9 will match.
bytes 10-14 do match and the hash codes for bytes 10-14 will match.
Under this circumstance, both the Inventors' Method as well as the methods used by others knowledgeable in the art will detect two matches of five bytes each and would easily be able to eliminate ten bytes of redundancy.

XI.(2): In Our Second Scenario, Assume that N-Bytes is 15.

Because a hash would be computed on two different 15-byte arrays, it is highly unlikely that the two hash codes will match. Even if by some extreme statistical improbability the two hash codes did match, the underlying fetch of the two 15-byte arrays would show an immediate mismatch.

With N-bytes equaling 15, no redundant data would be detected.

XI.(3): Conclusion

For those familiar with the art, it should be obvious that one wants N-bytes to be as small as possible in order to detect as many Runs as possible.

As a matter of empirical evidence, in the Preferred Embodiment, to achieve the best deduplication performance in terms of eliminating duplicate data and keeping the size of the Extended Reference File as small as possible, the best value for N-byte is in the range of 512 to 2048.

The Inventors speculate that the reason the values lower than 512 reduce deduplication performance is that as the value of N-byte becomes smaller then the number of places in the Extended Reference File matching an n-byte block increases.

Since the Method must pick some Run, it picks the "wrong Run". See Section XIII for a discussion of duplicate hash values.

To illustrate this, consider reducing N-byte to a value of 1. In this case, the DEDs would almost certainly be pointing to a an effectively random place in the Extended Reference File and the fact of the 1-byte match would not signify a high probability of a meaningful Run at that location (a Run whose length is, say, more than 100 bytes), thus wasting the effort needed to seek to the location in question.

XII. RAM AS A LIMITING FACTOR: N-BYTES VERSUS DIGEST DATA STRUCTURE MAXIMUM HASH COUNT (DDSMHC)

Assuming that one is implementing the methods used prior to the Inventors' Method, then the problem with making N-bytes as small as possible is that it increases the RAM needed to support the number of DEDs (e.g. hash table entries) one needs to store into the Digest Data Structure (DDS).(e.g. a hash table).

For instance, assuming
The hash codes generated do not generate the same hash code for two different byte arrays
The hash codes have perfect distribution properties
The Reference File is 1000 bytes in size
Then assuming that N-bytes is 100, we would need 10 DEDs inserted into the DDS.
On the other hand, if N-bytes is 10, we would need 100 DEDs inserted into the DDS.
As should be readily apparent from these examples, the smaller N-Bytes is, the larger the DDSMHC has to be.
Because RAM is a precious commodity, it is not unusual for implementers of the current art to make N-bytes quite large: 8 k is not unusual.
We cite from http://www.hifn.com/uploadedFiles/Products/Solution_Bundles/Data_De_Dupe/Hi fnWP-BitWackr-2.pdf)
2.3 Data Deduplication
Data deduplication is a technique that eliminates redundant blocks of data. In the deduplication process developed by Hifn, blocks of data are "fingerprinted" using the Secure Hash Algorithm (SHA-1), a trusted algorithm that is widely employed in security applications and communications protocols. Hifn implements the SHA-1 algorithm in specialized silicon that produces a 160-bit hash (also referred to as a "digest" or "fingerprint") from fixed length data blocks with block sizes between 4 KB and 32 KB.
Thus those familiar with the art will readily see a major improvement to the current art in that our arbitrarily small probe—currently 512 bytes in the Preferred Embodiment of the Invention—will likely detect far more Runs than those who set N-bytes to a larger value.

XIII. DUPLICATE HASH VALUES

Given an n-byte-block for which a hash value has been computed, it is possible for the hash value to be a duplicate.
This can be the result of two possibilities.
First, two n-byte-blocks with different contents can hash to the same value. This is the result of the so-called "Counting Problem" which shows that all hash functions must generate collisions if the number of bits in the hash value is smaller than the number of bits in the input. By enumerating all the inputs and listing all the hash values one can easily see this.

Eventually, there must be duplicates in this many-to-one mapping.

Second, and somewhat more problematic, it is possible for the same n-byte-block (by content) to appear in more than one position in either the Reference File or the Current File. We discuss this further in section XVII.

This is easily seen, for instance, if a user made a copy of a file larger in size than N-bytes and took a non-compressed Image Backup of the disk or disks on which the two identical files are stored. The file would appear in two places on the disk and thus one or more n-byte-blocks would be duplicated.

We presume the way that most synchronizers work is—when a duplicate n-byte-block is found—that a reference to one of the copies is stored along with a length-in-bytes or, almost equivalently, a length-in-blocks.

It is, of course, possible for our Method to examine both positions in the Extended Reference File and determine which sum of Run Lengths produces the smallest sum of sizes of Output Packets.

XIV. DIFFERENCE IN SPEED AND EFFICACY BETWEEN ROLLING HASHES (HASH CODES WITH POOR STATISTICAL PROPERTIES) AND NON-ROLLING HASHES (BETTER STATISTICAL PROPERTIES)

As those familiar with the art understand, as far as hash tables and hash codes are concerned, a good hash code has certain statistical properties, the object of which is to take random input and spread that input uniformly through a integer range of values so that the probability of two inputs (e.g., n-byte-blocks) having the same output is minimized. One typical offshoot of this good-hashing property is the so-called avalanche effect in which if a single bit of the input is changed then, on average, half the bits of the output are changed.

A non-Rolling Hash (e.g. MD5) is relatively good at achieving the goal of uniform distribution compared to any Rolling Hash with which the Inventors are familiar. Of course, the reason one might use a Rolling Hash instead of a non-Rolling Hash is the computational expense of non-Rolling Hashes.

Thus the method we teach uses the same technique that rsync and others do: where appropriate, a Rolling Hash is computed instead of a non-Rolling Hash because it is guaranteed that if two blocks have different hash values—whether rolling or non-rolling—then the contents of the two blocks are different. As we teach, above, if the two hash values are the same then there is a good chance that the contents of the two blocks are the same but the only way to guarantee this is to actually compare the two blocks, generally by having to fetch them from disk.

In the Preferred Embodiment of the Method, we use Rolling Hashes to allow us to rapidly scan for Runs in data that may be similar except for some number of inserted and/or deleted bytes. We discuss this further, below.

XV. THE LOGICAL STRUCTURE OF THE EXTENDED REFERENCE FILE.

The term "Extended Reference File" is a term of convenience.

In the Preferred Embodiment of the invention, it is a single file known to the operating system. We teach that it need not be a single file and there are good reasons why one may not want it to be a single file.

Consider for a moment a Reference File for which we are certain there is no Intrafile Duplication and thus a waste of time to perform deduplication; or the Reference File is read-only and is, thus, unmodifiable.

The Method we teach could easily place new output packets in a separate file. The question then becomes as to how to refer to a location in the Reference File or the file with the new output packets?

As those familiar with the art would immediately see, there are a large number of design choices to solve this minor problem. We discuss two possibilities.

In the first possibility, the output packet contains two fields. (1) A file reference, and (2) a byte position in the file.

In the second possibility, the output packet assumes that the Extended Reference File is a single file but that there is a side table that allows the Method to translate from an offset into a reference to (1) A file reference, and (2) a byte position in the file.

Let us explore the second possibility.

Let us say that the Reference File is 1,000,000,000 bytes in length and that the output file where output packets are to be stored is called the Output Packet File. If in the DED a position of 1000 is detected then it is obvious that some data from the Reference File is to be read. If, on the other hand, the position in the DED is 1,000,001,000, then data is to be read from the Output Packet File.

As a matter of definition, the Output Packet File is part of the Extended Reference File.

As should be immediately apparent to those familiar with the art, this can be extended to any number of files. All that need be maintained are data structures equivalent to an ordered table of file references (e.g. file names) and file lengths.

XVI. THE PACKET STRUCTURE OF THE EXTENDED REFERENCE FILE.

To repeat, the two inputs are the Reference File and the Current File. The output is the Extended Reference File that consists of an Old Reference File followed by zero or one Chapter packets followed by a collection of zero or more non-Chapter Output Packets followed by a Chapter Packet. A chapter packet is a special packet that marks the end of a Chapter and is the last packet written before the Chapter is closed and the File is closed.

Using a standard C syntax, a simpleminded Output Packet might have the following format:

Exhibit 2

```
struct IdenticalBlock
{
    int BlockNumber;
};
struct DifferentBlock
{
    int nBytes;
    unsigned char StringOfDifferentBytes[1];
};
union PacketUnion
{
    struct IdenticalBlock;
    struct DifferentBlock;
};
struct OutputPacket
{
    char BlockIndicator;
        /* A flag indicating what kind of Packet we have */
    union   PacketUnion;
};
```

Those familiar with the art would immediately understand that IdenticalBlock is a fixed-length data structure that represents (i.e. points to) a block in the Reference File. If, for instance, an n-byte-block is 512 bytes in length, an int is eight bytes, and a bool is one byte, then an OutputPacket containing an IdenticalBlock could represent those particular 512 bytes in nine bytes.

From the simpleminded data structure in Exhibit 2, we slightly modify Identical Block.

Exhibit 3

```
struct IdenticalBlock
{
    int BlockNumber;
    int nBlocks;
};
```

By adding int nBlocks, we can create a reference to a Run of contiguous matching data blocks in the Reference File and Current File.

Thus if there is a run of, say, one hundred blocks that match, this can be represented—using the data structure in Exhibit 3—by a single OutputPacket of seventeen bytes rather than one hundred OutputPackets which would have a total length of nine hundred bytes.

Adding the field int nBlocks has consequences that are not immediately obvious. This will be discussed below.

In the Preferred Embodiment, the IdenticalBlock structure implementation looks more like this:

Exhibit 4

```
struct IdenticalBlock
{
    int StartingPositionInReferenceFile;
    int Length;
};
```

That is, there is no necessity for the identical section to start on a block boundary. This allows partial block matching, which can improve the efficiency of the representation and increase the amount of data removed by deduplication.

Another optimization can be added for zero-filled areas, which apparently occur frequently in some common types of files. The data structure to represent a block of zeroes might look like this:

Exhibit 5

```
ZeroBlock.
    struct ZeroBlock
    {
        int Length;
    };
``` where Length is, of course, the number of zero bytes being represented.

XVI.1 Structure of the Matching Data Packet (MDP)

For purposes of this specification, the OutputPacket where the BlockIndicator indicates that we have matching data is known as a Matching Data Packet (MDP).

XVI.2 Structure of the Literal Data Packet (LDP)

For purposes of this specification, the OutputPacket where the BlockIndicator indicates that we have non-matching (i.e. "literal data") data is known as a Literal Data Packet (LDP).

XVII. DUPLICATE USER EMBEDDED DATA

Consider two large and nearly identical user files that happen to be slightly different at the end of the files. These files are actually or virtually stored in the Reference File. Further assume, for simplicity, that the two user files are defragmented.

The problem for all synchronizers that happen to use Hash Codes (and even for those that don't) is to determine which copy of the file (or n-byte block) to point to when a copy of the file (or n-byte block) is found in the Extended Reference File.

Presuming that there are two n-byte-blocks with the same content in the Extended Reference File and that the synchronizer goes through a phase in which n-byte-blocks are stored in a DDS then there are at least four possible strategies that can be used to store the corresponding DEDs into the DDS. (A) Store the first occurrence and ignore any further occurrences. (B) Store the last occurrence and throw away previous occurrences. (C) Store all occurrences of the DED into the DDS and deal with the extra complications as well as the overhead. (D) Randomly add the DED, by, say, generating a random number between 1 and 100 and then adding the DED if the number generated is above 80.

In the Preferred Embodiment, the first occurrence of the DED is stored and all newer ones are not stored. While this may not be optimal it is generally "good enough"; a great deal of deduplication will be forthcoming regardless of which copy is selected, because many of the parts that are the same between and among the files will be picked up.

XVIII. The Naive Method Possibly Used by Most other Synchronizers (English)

The basic idea behind most synchronizers is to create a Digest Data Structure (DDS) that represents a collection of hash values as well as other data, such as the position where the block can be found in one or both files to be synchronized. This DDS contains a digest for each n-byte-block. The DDS is usually of the form of a hash table and each digest is usually therefore the result of a hashing algorithm such as MD5 or CRC but, in any event, a hashing algorithm generating a collection of digests and stored in a DDS is used to shrink the size of the data to be manipulated; this is done because working with the raw data rather than a digest results in computation times that are so long as to be infeasible.

The two files are often called the "Reference File" and the "Current File". Conceptually, the Reference File could be a backup image taken on Monday and the Current File is a backup image taken on Tuesday.

In general, the Reference File is divided into n-byte-blocks and each block is represented by a hash value (CRC, MD5, SHA-1, etc.). Then the Current File is scanned (often byte-by-byte) and the same hashing algorithm is used to compute a hash value for any n-byte-block.

The assumption is generally made by most other synchronizers that two n-byte-blocks having the same hash value are, indeed, the same block. As Shnelvar (U.S. Pat. No. 6,374, 266) and many others (e.g. http://infohost.nmt.edu/~val/review/hash.pdf, which is incorporated herein by reference) have pointed out, this may be an invalid and highly dangerous assumption; nonetheless, this is the assumption that is made.

The inventors, anecdotally, are aware of the following: the well-known rsync program has an extra check to reduce the probability that two n-byte blocks having the same hash value (i.e. digest value) are, indeed, the same block using a technique roughly equivalent to the following:
  a. rsync computes a Good Hash on the whole "newer" file and transmits that along with the data.
  b. If this whole-file hash doesn't match on the receiver, then rsync does the whole operation again with a differently-seeded hashing algorithm.
  c. Repeat above until the whole-file hash does match.

Of course, this still isn't a guarantee of success, but it isn't as likely to fail as the naïve approach described above.

That is, rsync computes a whole-file Good Hash and transmits it to the receiver. rsync then calculates the Good Hash of the resulting file on the receiver. If they don't match, they redo the whole transmission with a slightly different hashing algorithm that should not have the same erroneous "equivalent block" problem.

Returning now to the Method that we teach, if a hash match is found, all that need be indicated is that the n-byte-block of data can be found at a particular offset in the Reference File. The algorithm continues until the Current File becomes exhausted.

Often, the list of offsets and unassociated data (i.e. data found in the Current File but not in the Reference File) is transmitted to a second computer so that the second computer can update its copy of the Reference File in order to create a copy of the Current File. This list of offsets and unassociated data is often called a Patch File.

Of course, the unassociated data could be passed to a zip-libe compressor to lower the overhead of transmitting many byes. As those familiar with the art know, if the data to be compressed has already been compressed (e.g. the data is part of a jpeg or a zip file) then it is likely that the "compression" will produce results larger than the already-compressed data.

Central and implicit to the method(s) described, above, is that the Digest Data Structure (DDS) fits in RAM. The DDS, usually of the form of a hash table, needs to fit in RAM because access to an element in the hash table needs to be quick in order to produce results competitive with other implementations. As those familiar with the art understand and as we taught in Section X, the difference in speed between accessing an element of a hash table in RAM versus a random access seek-and-read on a disk drive can be in excess of a million to one. Access across a network is often even slower. Therefore, placing the DDS (e.g. a hash table) on a relatively slow non-RAM device makes the computer program almost certainly impractical and uncompetitive.

Allowing the DDS to grow so that the DDS is placed in virtual memory merely shifts the problem of disk-based seeking from the application program to the operating system. There would be little if any gain in speed if the DDS were not part of the Working Set.

The Inventors wish to explicate the previous paragraph. What should be well-known to those familiar with the art is that hash codes have the desired property that given an input block for which a hash code is computed, the value of the hash code is, for all intents and purposes, random in the range for which the hash values are computed. This desirable property spreads the hash codes evenly through a hash table, thus reducing so-called hash table collisions. The undesirable side effect of this property is that if a hash table is placed in virtual memory, there would be much page file thrashing as the operating system constantly brings in pages of memory.

We now return to an explanation of how synchronizers work.

Consider a DDS which is a hash table using an MD5 as the hashing algorithm. Assume that the digest consists of MD5 entries. Each entry in the hash table is at least 128-bits long because an MD5 hash is 128-bits long; and each entry is generally longer in order to capture information such as block position in the Reference File. For simplicity, assume that each hash table entry is 128-bits long (16 bytes).

Most modern commodity computers (circa 2009) contain on the close order of a gigabyte of RAM. If this amount of RAM were completely committed to a hash table (thus leaving no room for the operating system and operational programs), then the hash table could represent at most $6.2 \times 10^7$ ($==10^9/16$) blocks. If each n-byte-block were 512 bytes, then the absolute maximum size representable by such a hash table would be 32 gigabytes.

32 gigabytes would be considered to be a large file by most modern home PC users. Note, though, that 32 gigabytes would roughly represent the size of an image backup for a common 60-gigabyte disk that was relatively full, given a 50% compression ratio.

Note that this 32-gigabyte limit is an absolute maximum for a computer with a gigabyte of RAM. The practical maximum is far below this for the following reasons.

First, if the hash algorithm used is SHA-1 instead of MD5 then each entry will be 20 bytes in length rather than 16. A hash table consisting of only SHA-1 entries could represent only 25.6 gigabytes rather than 32 gigabytes.

Second, as noted, above, each hash table entry will be larger than just the (CRC, SHA-1, MD5, etc.) digest. In the present Invention's Preferred Embodiment, each hash table entry is sixteen bytes long: Each entry in the hash table is a DED, which contains the following:

Exhibit 6 unsigned LowerHashValue;
unsigned BlockNumberInReferenceFile;
longlong GoodHashValue;

where "LowerHashValue" is the low 32 bits of the calculated "fast" Rolling Hash value (to be described, below); "BlockNumber" is the block number in the Extended Reference File to which the hash table entry pertains; and "GoodHashValue" is the CRC-64 ("good") hash value for that block. However, if a larger hash value, such as MD5 or SHA-1 were used, then clearly this data structure would be larger than 16 bytes.

Third, as noted, above, RAM is used for items other than the hash table. In order for most programs to work efficiently RAM must be allocated for things such as file buffers, frequently executed operating system code, and other data structures.

Fourth, as those familiar with the art understand, hash table collisions due to clustering render a hash table less-and-less efficient as the hash table become populated. As is readily apparent to those familiar with the art, as the Subscription Ratio approaches 100%, the odds of two hash values mapping into the same hash bucket approaches 100% even for the best hash functions. As the table becomes more full, more-and-more sophisticated algorithms (which, of course, become computationally more expensive) are required to handle hash bucket collisions. As we reported, above, in Section XX, one vendor recommends that the Subscription Ratio (SR) be approximately 0.30. In the Inventor's method, we achieve very good deduplication performance with SR's exceeding 30; a factor of 100 difference.

Modern rsync-like programs seem to have a practical upper bound of much less than a gigabyte. The Preferred Embodiment of this invention has a practical upper bound of at least hundreds of gigabytes.

XIX. THE NAÏVE METHOD PROBABLY USED BY MOST OTHER SYNCHRONIZERS (PSEUDOCODE)

Those familiar with the art will be able to understand the C-like Pseudocode syntax, below.

Exhibit 7
Pseudocode in which edge conditions have been ignored

```
001 // NBytesPerBlock: Number of bytes that the algorithm uses to
002 // "chunk up" the Reference File and Current File.
003 // Typical value is 512 bytes.
004
005 //
006 // Build DDS for Reference File
007 //
008 While there is data left to read in the Reference File;
009   Read NBytesPerBlock into a buffer;
010   Compute hash value of buffer;
011   Insert hash value and block number into DDS;
012
013
014
015 // NBytesPerCurrentFileBlock: Number of bytes that the algorithm
016 // uses to "chunk up" the Current File so that the Current File can
be further scanned
017 // byte-by-byte in order to locate blocks of data to be found in the
Reference
018 // File.
019 // The Preferred Embodiment uses a tuneable value of 256 Kbytes.
020 //  Almost any value larger than NbytesPerBlock can be used.
021 // We would expect larger values of NbytesPerBlock to increase
022 // performance.
023
024 //
025 // Read Current File and compare to Reference File
026 // Write to Extended Reference File (ERF)
027 //
028 While there is data left to read in the Current File;
029   Read NbytesPerBlockReferenceFile into BufferA;
030     PtrBufferA = start of BufferA;
031     While there is data left to process in BufferA;
032       Peel off NBytesPerBlock and place into BufferB;
033       HashOfBufferB = Compute hash of BufferB;
034       if HashOfBufferB exists in DDS
035       {
036          If there is any data in the Temporary Literal Buffer (TLB)
037          {
038             Emit a Literal Data Packet (LDP) based on the TLB
039                to the Extended Reference File;
040             Clear the TLB;
041          }
042          Create a Matching Data Packet (MDP)'
043          Emit the MDP to the ERF
044          PtrBufferA += NBytesPerBlock;
045       }
046       else
047       {
048          Store byte at PtrBufferA into the TLB;
049          PtrBufferA++;
050       }
```

XX. NOVELTY OF THE METHOD WITH RESPECT TO OVERSUBSCRIPTION OF THE DDS

The following non-obvious insights are central to the novelty of the current invention.

First, and foremost, is the insight that the DDS can be oversubscribed. That is, it is not necessary for the DDS to contain every hash for every n-byte-block. Indeed, a Subscription Ratio of 30 is fairly typical as implemented in the Preferred Embodiment.

To demonstrate the extreme novelty of this portion of the Invention, we quote from www.hifn.com/uploadedFiles/Products/Solution_Bundles/Data_De_Dupe/HifnWP-Bit-Wackr-2.pdf (which is incorporated herein by reference):

"-s, --hash_size N
Set the hash table size in N number of bits. The number must be between 16 and 32. The hash table will contain $2^N$ entries, e.g., N=16 will set a hash table with 65536 entries.

Each entry is a "hash bucket" which can contain a Block Address that points to a Dedupe Data Block. However, due to the hashing algorithm only a small percent of the entries can be filled before truncated hash duplicates occur, which will greatly affect the performance of the system. Generally one would want to select a hash size value that is large enough so that the volume size in blocks is less than 30% of the total hash table entries."

What the above tells us is that a manufacturer of hardware to do data deduplication uses the "standard" method of under-subscribing the hash table and suggests that the users specify a hash table size such that the DED's only consume 30% of the hash table (i.e. the DDS).

In the Preferred Embodiment of this invention, the DDS, like the one used by hifn (quoted, immediately, above), is a hash table.

The second non-obvious insight is that heuristic techniques can be used to find "runs of common blocks" so that the duplication of data in these common blocks can be eliminated and a reference-and-a-length can be substituted for the data. Substituting a reference and a length in order to eliminate duplication is well known to those familiar with the art.

The basic insight regarding the heuristic used in the Preferred Embodiment is that matching hash codes can be used to give clues as to where identical runs of matching data might be found. Various techniques will, be taught (See section XXXI. Using Heuristics to Determine where Runs of Identical Data can be Found).

Third, where the Repository is a device in which seek time is computationally expensive, this method uses the hash values to determine if the expense of seeking should be done rather than assume that two hash values that are identical point to identical data. This allows the Method to use computationally inexpensive hashes (e.g. Rolling Hashes) with poor theoretical properties with respect to collisions.

XXI. THE INVENTORS' METHOD IS ABLE TO FIND RUNS OF DATA AT POSITIONS OTHER THAN THOSE DIVISIBLE BY N-BYTES

We now answer the question posed in V(11) Summary—What about insertions and deletions?

We now teach how the Inventors' Method is able to detect Runs that do not start on positions in the Extended Reference File divisible by B-bytes.

For purposes of this explanation, assume that the cost of computing a CRC64 for an n-byte-block (e.g. N-bytes of data) is zero. Further, assume that we read in a B-byte-block from the Current File (in the preferred embodiment, 256K in size).

Then for each byte for which we can compute a CRC64 (that is, 256K−N-bytes+1) we compute a CRC64. We then search the DDS (that is, the hash table) and check if the hash code computed for the byte matches one in the DDS.

If there is a match on the CRC64's then we proceed to read the corresponding n-byte-blocks and check for a Run. If a Run is detected, then we perform an Expanding-The-Run operation.

XXI.1 Expanding-The-Run Explained

Assume that N-Bytes is 512 bytes and that in the process of Expanding-The-Run that 100 bytes of identical data are found prior to the n-byte-block and 200 bytes of identical data is detected following the n-byte-block, then we create and emit a Matching Data Packet (MDP) the fact that 812 (100+512+200) bytes of common data was found. We can then advance the pointer where we calculate CRC64's 200 bytes.

When we emit the MDP, we also advance the Current File Wall (CLW).

It is a novel feature of the Inventors' Method that the Method can and will compute hash codes in the Current File for, possibly many, positions other than positions divisible by N-bytes. When and if one or more of these hash codes are found to match entries in the DED, each such matching DED provides a block position in the ERF which is then used as a starting point by an Expanding-The-Run operation. This allows the Method to pick up Runs at positions other than those divisible by N-bytes.

Since on a standard IBM PC-type of computer there is a significant cost to computing CRC64's, the Preferred Embodiment does things somewhat differently.

The following is a simplification of what is actually done in the Preferred Embodiment; but what we teach here is, except for some optimizations, logically equivalent to the Preferred Embodiment.

In the Preferred Embodiment, the DDS is a hash table whose entries are indexed by a subset of the bits of the value of a Rolling Hash. The hash table entry contains fields for An n-byte-block location the value of Rolling Hash for the n-byte-block location a CRC64 for the n-byte-block.

As we have taught, above, CRC64s (and MD5's and SHA-1's, etc.) are computationally expensive. Relatively speaking, Rolling Hashes are very cheap to compute when one is computing a collection of them where the collection represents overlapping n-byte-blocks in which the blocks are separated by, say, one byte.

In the Inventors' Preferred Embodiment, most of the computation of a Rolling Hash can be accomplished with three additions, two subtractions, and two shift operations. This operation is computationally very inexpensive.

In the Preferred Embodiment, the following operations are performed:

The DDS is keyed off the Rolling Hash. If a match is found on the Rolling Hash value then for the n-byte-block in the Current File, a CRC64 is computed. If the CRC64 computed for the n-byte-block in the Current File matches the CRC64 computed for the n-byte-block in the Extended Reference File, then an Expanding-The-Run operation is performed.

The purpose for the extra complication of computing a CRC64 rather than depending exclusively on Rolling Hashes is that, on computer hardware circa 2009, the Inventors have found (as we have taught in Section X Seek and ye shall find it slowly) that it is computationally faster to compute a CRC64 than it is to access the data on a disk drive, and the reduction of "false positives" from Rolling Hash matches more than makes up for the additional computation time for calculating the CRC64.

XXII. IMPROVEMENTS OVER PRIOR ART (1). Modern rsync-like programs seem to have a practical upper bound of much less than a gigabyte. The Preferred Embodiment of this invention has a practical upper bound of at least hundreds of gigabytes. The reason for this is that methods like rsync or U.S. Pat. No. 6,374,266 require sufficient RAM so as to have room for the equivalent of a DED for each block of data in the Reference File. As those familiar with the art can see, one can shrink the needed size of the DDS by increasing the size of the block corresponding to a DED; but then the probability of finding matching data is reduced and thus redundancy elimination and compression are reduced in efficacy.

(2) rsync-like programs assume that two "good hash codes" that happen to be equal point to the same content. Our Method does not do that but, instead, uses the hash codes to determine if a seek that is computationally expensive in the time domain should be performed. Thus our Method is guaranteed to produce correct output while rsync-like programs are only likely to produce correct output.

XXIII. REVERSIBLE DIGESTS

We mean to use the phrase "Reversible Digest" in one of three senses.

(1) An algorithm such as "Generate an array of 1500 bytes of zeros." In this case all that needs to be noted is a flag for the algorithm (generate an array of zeros) and the number of zeros.

(2) An algorithm, such as LZW, that might compress an array of bytes and for which decompression recreates the array of bytes exactly.

(3) A "trivial" transformation of an array of bytes; such as reversing the order of the first two bytes of the array.

The Inventors recognize that the Digests stored in table entries of the DDS need not be hash codes similar to CRC64s or SHA-1s; but could be, for instance, the underlying data itself.

We explain the paragraph, immediately above, further; by example.

Assume that the DDS is organized in such a manner that table entries are fetchable by key and where the fields of the DED comprise A 64-byte key A byte offset in the Extended Reference File Instead of matching on a hash code, an alternative embodiment of the Method could use 64 (or whatever number is felt to be appropriate by User Option) bytes of the original data to probe the Current and Reference Files.

In another embodiment, it might be found to be efficacious to use every 16th byte of the n-byte-block as the reversible digest and to key off of this value to find matching Runs.

Again, the novelty of the Invention is that the DDS be oversubscribed and the form of the Digest is almost irrelevant.

Thus, when we use in the claims the phrase "Digest", we mean both a hash code and a Reversible Digest.

XXIV. CHAPTER 0 IN THE EXTENDED REFERENCE FILE IS SPECIAL IN THE PREFERRED EMBODIMENT.

In the Preferred Embodiment, Chapter 0 contains no information relating to user data, but is used only as a "dummy" chapter to which "real" chapters are later added. However, as a User Option, it would be possible to store the actual data of Chapter 0 as "raw" data.

Indeed, in previous incarnations of the Preferred Embodiment, all that was done to create a Chapter 0 was that a Chapter packet was appended to the raw user data. This was abandoned in the Preferred Embodiment because (1) It modified a user file and (2) it performed no useful intrafile deduplication of a Reference File.

It would be a rather trivial operation to modify the Chapter Packet to reference files (See Section XXVII for an example of how this could be done.)

This would be desirable, in the not infrequent case, that the user knows that the data associated with the first Chapter of the Extended Reference File (ERF) contains little that could be deduplicated. Thus, attempting to do Intrafile deduplication on this first Chapter is a waste of computer time.

In this case, the Method could create an ERF by appending a Chapter 0 packet to the "raw" data. A DDS is then built from this ERF.

XXV. ADDING THE CHAPTER PACKET TO THE EXTENDED REFERENCE FILE Assuming the Extended Reference File is on a Worm Device.

We extend the discussion started in Section XV.

It is not an essential feature of the Method that the Extended Reference File be on a WORM storage device but the Method readily accommodates WORM storage devices. Once the final Decorated Packet representing the final bytes of the Current File has been processed, a special Decorated Packet, the Chapter Packet, is emitted. The Chapter Packet may look something like this:

---

Exhibit 8
Possible structure of fields of a Chapter Packet

Chapter Flag
Position in Extended Reference File of the first Decorated Packet emitted for the Chapter
Chapter Number
Magic Number
Human Readable Description of Chapter
Spare Bits Reserved for Future Use.

---

None of the fields following the "Position in Extended Reference File of the first Decorated Packet emitted for the Chapter "field are strictly necessary. The fields starting at the Chapter Number are useful to establish that the Chapter has been closed successfully as well as providing human readable information about the chapter.

The Chapter Number is not necessary since the Chapter Number can be computed by marching backwards through the chain of Chapter Packets and counting the number of Chapter packets until a special "no preceding Chapter Packet" flag is detected.

Having a Chapter Number in the Chapter Packet is useful so that the Method can quickly determine the number of Chapters in the Extended Reference File.

The Magic Number is not necessary assuming that the Method as implemented in software and hardware has operated correctly. The Magic Number is there in case, for instance, the hardware has failed. The Method is expecting a Chapter Packet as the last bytes of the Extended Reference File. If the value in the Magic Number field is incorrect, then the Extended Reference File (ERF) is corrupted.

"Human Readable Description of Chapter" field only serves the purpose of identifying the Chapter for humans. It is not necessary for the successful operation of the Method as implemented in software or hardware.

As anyone familiar with the art understands, the "Spare Bits Reserved for Future Use" field is not necessary for the successful operation of the Method as implemented in software or hardware.

Even though the Chapter packet points to the "Position in Extended Reference File of the first Decorated Packet emitted for the Chapter", finding the beginning of the previous Chapter packet is easy since the Chapter Packet is of fixed size. One merely subtracts the size of the Chapter Packet from the "Position in Extended Reference File of the first Decorated Packet emitted for the Chapter" in order to find the previous Chapter Packet in the chain of Chapter Packets.

XXVI. ADDING THE CHAPTER PACKET TO THE EXTENDED REFERENCE FILE ASSUMING THAT THE EXTENDED REFERENCE FILE IS NOT A WORM DEVICE. USING A CHAPTER TABLE OF CONTENTS

As implemented in the Preferred Embodiment, the packets of data described in Sections XVI and XXV can easily be stored on a WORM storage device because only new data is appended to the file.

Assuming that the implementer of the Method chooses to store the data in a rewriteable device, then it would be efficacious to create a Chapter Table that would list the starting position of each Chapter.

One of many ways to implement a Chapter Table of Contents would be to store it as an array of

---

Exhibit 9
Possible structure of an element of the Chapter Table of Contents Array Position in Extended Reference File of the first Decorated Packet emitted for the Chapter
Human Readable Description of Chapter
Spare Bits Reserved for Future Use.

---

As those who are familiar with the art are aware, this array of Chapter structures can be implemented in any number of ways. The count of Chapters could be stored separately and the array could be stored in a file on disk.

In the alternative, the implementer or the user via a User Option could specify that the Chapter Table of Contents array could have a maximum size and be stored at the beginning of an Extended Reference File.

XXVII. STRUCTURE OF AN EXTENDED REFERENCE FILE WITH MULTIPLE CHAPTERS STORED ON A WORM STORAGE DEVICE

Even though this section indicates that we are discussing ERFs stored on WORM drives, those familiar with the art understand that the techniques taught here work equally well on non-WORM drives or devices that enforce a Write Fence.

As should be clear, the Process of processing Current Files and adding output packets to and Extended Reference File can be repeated as many times as is useful. The Method allows each Current File processed to be reconstituted separately. We call the Original Reference File "The First Chapter" and the portion of the Extended Reference File containing the additional data needed to reconstruct the first Current File added to the Reference File as the "Second Chapter."

Note that the First Reference File may have zero length.

For the purposes of clarity in the specification, above, we did not show the Chapter Packet being inserted after the first Reference File. In the Preferred Embodiment, a Chapter Packet is emitted to the Extended Reference File.

The logical structure of the Extended Reference File with five Chapters in the Preferred Embodiment looks something like this:

| Exhibit 10 | | | | |
|---|---|---|---|---|
| (1) First Reference File (May have zero length) | (2) Chapter Packet of the First Chapter | (3) First Decorated Packet of Second Chapter | (4) Decorated Packets representing the Second Chapter | (5) Chapter Packet of the Second Chapter |
| (6) First Decorated Packet of Third Chapter | (7) Chapter Packet of the Third Chapter | (8) First Decorated Packet of Fourth Chapter | (9) Chapter Packet of the Fourth Chapter | (10) First Decorated Packet of Fifth Chapter | (11) Chapter Packet of the Fifth Chapter |

As we taught in Section XV, these five chapters could be split into any number of files. Of course, having these five chapters split into the five pieces—such that each piece is a Chapter—is one obvious partitioning of the Chapters.

Assume that we wish, indeed, to partition the ERF into five separate files. The Method and the Preferred Embodiment could both be extended as follows.

A metafile which indicates the names of the five files in the correct order is created. Let us call the file Metafile.txt. Using Microsoft Windows filename syntax, the content of Metafile.txt might be something like that of Exhibit 11.

Exhibit 11
(Lines starting with semicolons are comments. "cta" is the preferred filename extension for chapters in ERFs.)

```
; chapter 0 on a local read-only device
; Note that the structure of Y:\First.cta could, in turn,
;   contain a field that contains a filename that refers to the
;   actual file of undeduplicated data.
Y:\First.cta
; Contains output packets representing literal and reference data.
; Stored on a remote network drive
; This is the second Chapter: Chapter 1
\\RemoteComputer01\c\June\second.cta
; Stored on a remote network drive
; This is the third Chapter: Chapter 2
\\RemoteComputer01\c\June\third.cta
; Stored on a local drive
; This is the fourth Chapter: Chapter 3
c:\June\fourth.cta
; Stored on a local drive
; This is the fifth Chapter: Chapter 4
c:\June\fifth.cta
```

Each "*.cta" file ends with a Chapter Packet.

It has been the experience of the Inventors that validating the internal consistency of such a metafile and making sure that all the files are both internally and externally consistent is a daunting but achievable task.

As those who are familiar with the art understand, implementing such metafile handling adds considerable flexibility and power to the Method; allowing the implementers to create delta files so as to allow the synchronization of huge files by merely shipping, say, c:\June\fifth.cta across a network.

Extending the discussion of Section XXIV, using the techniques taught in this section, it would become a trivial operation to implement having Chapter 0 either refer to no user data or have it point at a user file that is on, say, a WORM device.

XXVIII RECONSTITUTING A CHAPTER FROM AN EXTENDED REFERENCE FILE

In the Preferred Embodiment, the Chapter Packets are appended to the Extended Reference File (ERF) as the last decorated packet after a Current File has been completely processed. In the example, below, we teach how to reconstitute a Chapter from a successfully created ERF.

Consider the ERF that we taught in XXVII. Assume that we wish to reconstitute the Third Chapter. That is, we are attempting to reconstitute the second file "added" to the base Reference File.

Referring to Exhibit 10 and Section XXV and using C-style pseudocode, we would seek to EOF—sizeof(Chapter Packet)
We would then read the Chapter packet representing
(11) Chapter Packet of the Fifth Chapter
We now are able to compute the position of
(9) Chapter Packet of the Fourth Chapter
since the Chapter Packet of the Fifth Chapter has a reference to the first packet
of the Fifth Chapter, and as explained in Section XXV, this has a fixed offset from the previous Chapter Packet.
We repeat this process in the obvious manner to read
(7) Chapter Packet of the Third Chapter
Again, from "(7) Chapter Packet of the Third Chapter" we are now able to get
(6) First Decorated Packet of Third Chapter
because the field
Position in Extended Reference File of the first Decorated Packet emitted for the Chapter
is directly accessible from "(7) Chapter Packet of the Third Chapter".

We seek to "(6) First Decorated Packet of Third Chapter" and read the flag to determine what kind of Decorated Packet we have. In the Preferred Embodiment, we have several types of flags, but for the purposes of teaching in this section of the specification we teach that there are only three types of Decorated Packet Flags
(1) Literal Data Packet
(2) Match Data Packet
(3) Chapter Packet
The Method reads packets one at a time.
If the packet type is a Literal Data Packet then the "literal bytes" are emitted to the Reconstituted File.
If the packet type is a Match Data Packet, then we seek to the position in the Extended Reference File, and copy the number of bytes indicated in the Length field of the Match Data Packet to the Reconstituted File.

If the packet type is Chapter Packet then we are done and the Chapter has been reconstituted.

XXIX. THE DDS CAN BE REBUILT

As we see from Section XXVIII, the DDS is never referred to while reconstituting Chapters of original data.

It should thus be obvious that while the DDS contains valuable data about the Extended Reference File (ERF), a new DDS can be built given only the ERF.

Thus the DDS can be deleted at only the cost of rebuilding it.

XXX. BRIEF CONCEPTUAL OVERVIEW OF THE INVENTORS' METHOD

For illustrative purposes let us assume that an n-byte block is 256 bytes long and that a B-byte-block is 256K (262,144 bytes) and, further, that the Current and Reference files are identical and of size one megabyte (1,048,516 bytes).

If the DDS is a mere four elements in size (a ridiculously small size but we are attempting to illustrate the method), and, further if the offsets selected for the four DDEs are as listed in Exhibit 12 then the Method would proceed as follows:

Phase 1: A Reference File Analysis Phase (RFAP) is performed in which the DDS is built. The Reference File is read and a four-element array DDS is built. For purposes of this discussion assume that the four DEDs actually inserted into the DDS for four n-byte blocks are roughly in the middle of each B-byte-block. We present Exhibit 12 which is the DDS sorted in order of offset in the reference file.

Exhibit 12

| Hash table entry | Offset in Reference File | Hash Value |
|---|---|---|
| 2 | 128K | 0x1232 |
| 1 | 384K | 0x7731 |
| 3 | 640K | 0x9AB3 |
| 0 | 896K | 0xCAB0 |

As those familiar with the art understand, the hash values are, essentially, random values associated with the corresponding n-byte block found at the "Offset in Reference File". Those familiar with the art also understand that the order of insertion of hash values into the hash table is also, essentially, random. For this hash table assume that the low order two bits of the hash value are used as an index into the hash table and that there were a vast (4K-4) number of collisions leaving only these four hash codes. Or, in the alternative, that we divided the total Reference File length by 4, executed a seek to each position indicated in the table in Exhibit 12 and computed the hashes and that there were no hash collisions.

Phase 2: The Current File Redundancy Elimination Phase (CFREP) in which the Current File is examined in light of the data in the DDS built in the RFAP.

Continuing our discussion, the data in Exhibit 12 (essentially, the DDS) is used as follows.

A B-byte-block (256K block) is read into memory. Conceptually, roughly 256K (rolling) hashes are built and stored in a table; that is, one for each overlapping n-byte block in the B-byte-block. The table is then examined (and since the Current File and the Reference File are defined to be identical for this illustration) we know that at offset 128K in the Current File that we shall find a hash code whose value is 0x1232.

Having found a matching hash code it is a simple matter to bring in a block from the Reference File. For convenience we bring in a B-byte-block starting at offset zero. Note that we could bring in any size block that includes the n-byte block at offset 128K in the Reference File. Assume for this illustration that we bring the first B-byte (256K) block into memory.

Since the Reference File and the Current File are identical, we are guaranteed that the two n-byte blocks at offset 128K are identical, as well. The simple version of this Method then compares the contents of the two B-byte-blocks by using offset 128K as an anchor from which to determine the length of the run. In this particular case both B-byte-blocks are identical so all that need be emitted to the Extended Reference File is a notation that 256K bytes starting at offset 0 in the Reference File is redundant and the redundancy can be eliminated.

The simple Method continues with the next three B-byte-blocks in a similar manner. In this simple-minded example, four small packets of information indicating the redundancy to be removed replace a megabyte of redundancy.

Of course anyone familiar with the art can see some obvious optimizations. Perhaps the most obvious is that the Method—having detected a synchronization point at offset 0 in the Reference File—can Expand The Run by continuing to read forward until synchronization is lost. In our particular example this would mean that the entire Current File would have the redundancy eliminated and thus four packets would be replaced by one.

XXXI. USING HEURISTICS TO DETERMINE WHERE RUNS OF IDENTICAL DATA CAN BE FOUND

Once the realization is made that the DDS can be oversubscribed, then the fundamental problem becomes how to use the limited information in the DDS to determine common runs of data. We describe and will claim several variants.

Before we do so, we make note of an optimization that is implemented in the Preferred Embodiment. In the Preferred Embodiment the Current File is logically broken up into B-byte-blocks. A B-byte-block (mnemonically, a "big-number-of-bytes block") has a size that is, generally but not necessarily an even multiple of n-bytes. The number of bytes in a B-byte-block will be claimed to be tunable. In the Preferred Embodiment its default value is 256K.

As is well known to those familiar with the art, reading a large block of data into RAM from a Repository is likely to be considerably faster than reading sequentially and repetitively the same total number of bytes as a number of blocks each containing a small number of bytes. In addition, a larger B-byte-block will provide more opportunities for detecting runs of common data between the Reference and Current Files when the subscription ratio is increased.

The number of bytes in a B-byte-block should be selected to take advantage of any hardware characteristics of the user's hardware. For instance, it may be that an optimal size for a B-byte-block is the number of bytes on a track of a disk drive or the number of bytes in a disk drive's on-board cache.

The purpose of a B-byte-block is to bring into RAM a section of the Current file to be rapidly examined without necessitating I/O that is expensive in the time domain.

XXXI(1) Brute Force

The inventors claim this method.

If two digest values match between the Current and Reference Files, find the positions in both files for the n-byte block corresponding to those digest values, then read forwards and backwards to find the boundaries of the run of identical data. Because of the nature of hash codes the number of bytes of identical data may be zero.

We repeat here what we wrote in Section VIII, the Inventors assert that it is unsafe to assume that if two digests match that the underlying data matches. Nonetheless, we teach that if the user of the Method wishes to assume that if two digests match that, then, the underlying data matches, and assuming that the user's assumption is correct, then this Method will produce correct output and the original data will be recovered.

If the underlying data does match for a certain number of bytes, then, optionally, the Method we teach could expand the match by an arbitrary number of bytes in both directions by using the method we taught in Section XXI. We also teach that we could use the method of U.S. Pat. No. 5,446,888 (Pyne) to detect insertions and deletions of small numbers of bytes. We also teach that there are many Insertion/Deletion Algorithms known to those familiar with the art for detecting insertions and deletions between two relatively small strings of similar binary data.

For instance, assume that we find that 256 bytes of data in the Reference File and Current file indeed match. Further assume that this 256-byte block of data can be found at positions 50000 in the Reference file and 150000 in the Current file.

The Method would then read forwards and backwards in the Reference and Current Files until there was a mismatch. Assume that mismatches were found at offsets 40000 in the Reference File (140000 in the Current File) and 60000 in the Current File (160000 in the Reference File).

The Method could then, optionally, extend the potentially matching data area by, say, 10000 bytes in each direction (that is, to 30000 and 70000 in the Current File) and then use one of the Insertion/Deletion Algorithms to see if only a small number of bytes has been inserted or deleted near the matching data (40000 through 60000 in the Reference File and 140000 through 160000 in the Current File).

XXXI(2) Using Multiple Hash Codes

The inventors claim this method as a dependent claim.

The method of [XXXI(1) Brute Force] may not be optimal because of the possibility that a particular n-byte block may be repeated several or many times in either the Reference File or the Current File. As those familiar with the art know, there may be many instances of a block of zeros on a user's disk. Similarly, other blocks might be repeated, especially if the user keeps multiple copies of files in the user's Repository.

Because blocks of zeros occur so often, the Preferred Embodiment has special handling for runs of zeros.

The Preferred Embodiment also implements a method that uses offsets of blocks associated with hash codes to decrease the number of seeks necessary to establish where long runs of common data may be found. As those familiar with the art understand, on modern computers seek operations are computationally expensive and are thus to be avoided.

The method that we describe and which we will claim looks at the corresponding relative offset of n-byte blocks associated with hash codes.

We give an example.

Consider a Reference File with n-byte blocks beginning offsets and associated hash codes. Assume that the hash codes represent unique blocks; that is, assume that there are no collisions.

| Exhibit 13 | |
| --- | --- |
| Offset | Hash Code |
| 150,000 | 1234 |
| 250,000 | 1234 |
| 550,000 | 2345 |

Consider a Current File with n-byte blocks beginning offsets and associated hash codes. Assume that the hash codes represent unique blocks; that is, assume that there are no collisions.

| Exhibit 14 | |
| --- | --- |
| Offset | Hash Code |
| 450,000 | 1234 |
| 550,000 | 1234 |
| 850,000 | 2345 |

As should be obvious to anyone familiar with the art, detecting and accounting for long runs is almost always better than processing a collection of short runs because there are fewer packets of common information to transmit to the Extended Reference File. Also, there is the reduction in the overhead in decoration.

Assuming that one processes the above two tables in the order listed (e.g., offset 100,000 is processed before 200,000), one could use the method as indicated in [XXXI(1) Brute Force]. As is apparent if one uses the brute force method, either (1) the brute force method either will not detect a possibly longer run, or (2) four seek operations would need to be performed to analyze which run to use.

Assume that a naïve brute force method was used. In this case the program would seek to position 150,000 in the Reference File and position 450,000 in the Current File. The program would then search in those vicinities for common data and would likely find commonality of less than 100,000 bytes.

On the other hand, the fact that the distance between location 550,000 and 850,000 in the Current File is the same as the distance between location 250,000 and 550,000 in the Reference file indicates the possibility of a Run of 300,000 matching bytes between the Reference File and the Current File at the respective locations in those Files. If this is determined to be the case on comparison of the respective contents of the Reference File and the Current File, this commonality of 300,000 bytes could be eliminated and a single packet of information (which is only a few bytes long) representing the common 300,000 bytes could be transmitted to the Extended Reference File.

XXXII MEMORY MAPPED DISK FILES

A feature of, at least, some Microsoft operating systems is to allow the programmer to appear to load an entire huge file into RAM that is smaller than the file.

While this may reduce the programming effort, it merely defers to the operating system the work of chunking the data.

XXXIII. METHOD (ENGLISH)

As we did with the pseudo-code, this explanation ignores edge conditions in order to teach the Method with some clarity. Those familiar with the art understand that the handling of edge conditions is where the major work (called, colloquially, "grunt work") of programming occurs but is not illustrative of method or the novelty of method.

XXXIII.(1) The Method Summarized

The Method can be summarized as follows:

Find two n-byte-blocks with identical hash codes. Move forwards and backwards from the point of the match in the Reference and Current Files in order to detect and Output Packets.

XXXIII.(2) The Method Optimized in the Face of Various Resource Availability Conditions.

The objective of this Method is to minimize the time and computer resources necessary to eliminate the redundancy between two, possibly large, files.

Here is a partial a list of constraints circa 2009.

(1a) Disk seeks are on the order of 8 milliseconds. This is the major constraint in modern computers but we foresee technology in which this constraint is removed. That is, we foresee a technology in which the repository has many of the features of modern RAM but has the additional feature that it is both cheap and maintains its state when power is removed.

(1b) RAM is relatively expensive compared to disk space. A gigabyte of ram costs approximately $20.

(2) It is computationally expensive to compute a Good Hash. In order to quickly compute a Good Hash special hardware may be employed.

1a and 1b are variants of "seeks are slow/fast."

There are thus four possibilities that are presented depending on whether (1) Seeks are slow or fast; and (2) Whether Good Hashes are cheap or expensive to compute. The Method will vary what needs to be computed and its strategy for randomly reading from the Reference File.

XXXIII.(2)(1) Seeks are Expensive; Good Hashes are Expensive.

Circa 2009, this is the common case for the typical computer. Nonetheless, the computation of a Good Hash is expensive but takes less time than a random seek.

Under this condition both seeks and Good Hashes are to be avoided and the Method does this by using Rolling Hashes and other heuristics to avoid both of these expensive operations.

Thus the Method will store both a Rolling Hash and a Good Hash as it builds the DDS for the Reference File.

The Method will then use the Rolling Hash as an "initial match".

The methods will then either (a) continue to compute more Rolling Hashes to see if there are more matches in the right order and at the right distances before committing to computing a Good Hash, or (b) Immediately compute a Good Hash (depending on either a heuristic to determine which to use or a User Option).

Once it has been determined that a Good Hash should be computed, the Good Hash is computed and then the DDS is examined for a Good Hash matching value. If a match(es) is found, then the B-byte-block(s) corresponding to the matched Good Hash is brought in and the B-byte-block(s) is/are searched backwards and forwards for a Run.

Those familiar with the art fully recognize that Runs may continue backwards and forwards for many B-byte-blocks.

XXXIII.(2)(2) Seeks are Expensive; Good Hashes are Cheap.

This is the next most likely scenario circa 2009.

Good Hashes can be made cheap either by a novel Good Hash algorithm being discovered or Good Hash dedicated hardware being added to the computer. See McLoone, above.

Under this condition seeks are to be avoided but Good Hashes are to be used.

Thus the Method will store only a Good Hash as it builds the DDS for the Reference File.

The Method will then use the Good Hash as an "initial match".

The methods will then either (a) continue to compute more Good Hashes to see if there are more matches in the right order and at the right distances before committing to computing a seek, or (b) perform a seek in the Reference File (depending on either a heuristic to determine which to use or a User Option).

Once the Good Hash has been computed, the DDS is searched for a Good Hash matching value. If a match(es) is found, then the B-byte-block(s) corresponding to the matched Good Hash is brought in and the B-byte-block(s) is/are searched backwards and forwards for a Run.

Those familiar with the art fully recognize that Runs may continue backwards and forwards for many B-byte-blocks.

XXXIII.(2)(3) Seeks are Cheap; Good Hashes are Expensive.

Seeks can be made cheap by existent but as yet (2009) impractically expensive technology, e.g., Solid State Disk (SSD).

Under this condition seeks are not to be avoided.

Thus the Method will store only a Rolling Hash as it builds the DDS for the Reference File.

The Method will then use the Rolling Hash as an "initial match".

Those familiar with the art fully recognize that Runs may continue backwards and forwards for many B-byte-blocks.

XXXIII.(2)(4) Seeks are Cheap; Good Hashes are Cheap.

Seeks can be made cheap by existent but as yet (2009) impractically expensive technology, e.g., Solid State Disk (SSD).

Good Hashes can be made cheap either by a novel Good Hash algorithm being discovered or Good Hash dedicated hardware being added to the computer. See McLoone, above.

Under this condition neither seeks nor Good Hashes are to be avoided.

Thus the Method will store only a Good Hash as it builds the DDS for the Reference File.

Those familiar with the art fully recognize that Runs may continue backwards and forwards for many B-byte-blocks.

XXXIII.(3) Hash Codes in the Right Order and at the Right Distances.

In the discussion in section XXXIII.(2), above, we referred to "continue to compute more (Rolling) Hashes to see if there are more matches in the DDS in the right order and at the right distances before committing to a seek".

Since—using current 2009 technology—both seeks (one can only do about 100 random seeks per second on the typical personal computer) and Good Hashes are expensive, the Method attempts to minimize these costs in the time domain by using heuristics to minimize the use of seeks and the computation of Good Hashes.

One technique used by the Method is to note that matches on the Rolling Hashes can appear in the right order and at the right distances.

For instance, let us say that a Rolling Hash match can be found at position 0 in the Reference File (this positional information is extracted from the DDS) and position 1000 in the Current File.

The Method could continue computing Rolling matches and then detect that there is a Rolling Hash match at positions 512 and 1512 in the Reference File (this positional information is, again, extracted from the DDS) and the Current File.

A Rolling Hash match may not be found at 1256 even though there is a Run that includes that position, because the DDS may be oversubscribed at that position.

Having detected there are now two Rolling Hashes that match in the proper order and at the proper distance, the Method may then choose to compute one or more corresponding Good Hashes. It could then use these Good Hashes to examine the DDS and determine if a seek should be performed.

Note that the distances need not be exact because the Method may use binary differences to emit decorated packets. Thus the Method may use a heuristic that says that the matches may be at N-byte offsets plus some arbitrary heuristically set value.

Thus, for example, the Method might decide that the second Rolling Hash at positions 514 and 1514 (as opposed to 512 and 1512) are matches at "in the right order and in the right positions".

An obvious extension to this Method is to use three or more Rolling Hash matches "in the right order and in the right positions" to determine if a Good Hash is to be computed.

In fact, if we have enough Rolling Hash matches at corresponding places in the data, we could skip the Good Hash generation and just read the data, as the probability of several Rolling Hash codes matching at the right places generating a False Positive might be small. With current technology this is unlikely to give much improvement because calculating a few Good Hashes takes much less time than one disk seek, but that may not be true in the future.

Those familiar with the art understand that where Good Hashes are cheap that we could substitute Good Hashes for Rolling Hashes in the discussion, above.

XXXIII.(4) Brief Overview

In the Preferred Embodiment, where seeks are expensive and the computation of Good Hashes is expensive XXXIII.(2)(1), above) the Reference File is logically broken up into NN n-byte-blocks. A subset of the NN n-byte-blocks (whose count is DDSMHC) is selected to fill a hash table. The hash table contains an array of the following data structure:

---
Exhibit 15
---
unsigned LowerHashValue;
unsigned BlockNumber;
longlong GoodHashValue;
--- where "LowerHashValue" is the low 32 bits of the calculated "fast" Rolling Hash value (as described, above); "BlockNumber" is the block number in the Reference File to which the hash table entry pertains; and "GoodHashValue" is the CRC-64 (i.e. Good Hash, computationally expensive, but having desirable collision avoidance characteristics) hash value for that block.

A B-byte-block of the Current File is read starting at byte offset 0 in the Current File. Whereas an n-byte-block is typically 256 bytes, a B-byte-block may be 256K bytes. A B-byte-block is supposed to contain many n-byte-blocks although, theoretically, a B-byte-block could be smaller or larger than an n-byte block. Since computer files are not, in general, an exact multiple of BN, there is a small chance that the last B-Byte-block will be smaller than an n-byte-block. In our example, the probability that a B-Byte-block will be smaller than an n-byte-block is 1:1000.

We define here that the Match Finding Result Map (MFRM): is a map containing one entry for each of the Rolling Hash matches that were found for a specific b-block, together with their respective ERF block numbers and Good Hashes. The Inventors have coined this phrase.

The first n-bytes (e.g. 256 bytes, bytes 0 through 255) of the B-byte-block has a (rolling) hash code computed and this value is looked up in the DDS. If it is found in the DDS, then that fact and the associated Rolling Hash information is stored in the MFRM. Then the next Rolling Hash code, for bytes 1 through 256 of the B-byte-block, is computed and looked up in the DDS and the appropriate data is stored in the MFRM. This continues until all of the Rolling Hashes in the b-byte block have been processed.

Instead of calculating the Rolling Hashes "on the fly", the Method could, equivalently, build a table of Rolling Hashes first, then search the DDS for each Rolling Hash in turn.

XXXIII.(5) Extended Reference File DED Storage Overwrite Strategy (ERFDSOS)

As we stated in the definition for Extended Reference File DED Storage Strategy (ERFDSOS): Because the DDS is oversubscribed, as new Output Packets are generated and new n-byte blocks of data are logically appended to the Extended Reference File, a strategy needs to be used to determine when to overwrite older DEDs. As those familiar with the art will readily see, there are many strategies that can be used to determine when to replace older elements in the DDS with newer DEDs representing newly created Output Packets.

There are many possible techniques for selecting which DEDs are to be inserted into the DDS. Perhaps the simplest is to select every SRth n-byte-block and then compute a DED for it and insert the DED into the DDS.

Since the RAM memory allocated to DEDs is assumed to be a relatively precious resource, we do not wish to waste entries by not filling them. If the DDS is a hash table then the algorithm used in the last paragraph may not be optimal for multiple reasons.

One reason is that if multiple DEDs all hash to the same value then a hash table entry or entries will remain vacant and useful information will be lost. Let us give a possibly unrealistic example.

If the number of n-byte-blocks is 200 and the number of hash table entries is 10, then this generates an SR value of 20. If the tenth and twentieth n-byte-block hash to, say, the third entry in the hash table then the hash table will have at least one slot that is empty.

As anyone who is familiar with the art understands, there are numerous trivial ways to fix this. Perhaps the most trivial is to check the entry in the hash table and, if occupied, ignore this n-byte-block and use the next n-byte-block to compute a hash and fill an entry in the table.

This algorithm does, though, show that there is an interesting complication. Consider a Reference File that is composed of nothing more than two identical sub-files; each sub-file located at an n-byte boundary. Since a sub-objective of the Method is to detect commonality between a Reference File and a Current File, the question is: Which hash code and associated Reference File or Current File offset associated with an n-byte-block (the first or a later one) is to be entered into the DED (e.g. hash table)?

In our particular example, it doesn't matter because the two sub-files are identical. But if they are slightly different then it matters because this Method reduces redundancy by substituting a pointer-to-an-offset-and-a-length in the Reference File for the actual contents of the stream of bytes in the Current file.

This problem of collisions in the hash table can be eliminated, of course, by using something other than a hash table to store DEDs. By storing the hash codes in a, say, a red-black tree, multiple DEDs with the same hash code can be inserted and searched for in O(log n) time.

Using a red-black tree eliminates many of the complications of multiple identical hash values being inserted but, clearly, any Database Mapping Engine could be used to (1) detect if a hash value exists (the hash value is used as a key), or (2) fetch the data associated with the particular hash value.

As those familiar with the art of Programming are familiar, generally there is no a priori optimal strategy for performing any operation. Generally, if there are several possible strategies, the implementers of a method will pick a default one and allow for one or more User Options to select which strategy to use.

For instance, in a word processing program, a user option might be how often—measured in minutes—to save a copy of the document being worked on. There is no a priori optimal answer and the user sets a User Option depending on the user's preferences.

Thus the user might have a preference to have no DEDs substituted in the DDS as Output Packets are added to the Extended Reference File (ERF). By selecting this option, the user may be indicating that she has a collection of Current Files to be added as Chapters that are variants of a base Reference File.

Let us explain further what we mean by the previous paragraph.

Consider a company that has purchased, say, ten identical computers with identical disk drives containing identical data on January 1 before any user even turns on any one of these ten computers. Clearly only a single machine needs to have a backup taken since on January 1, all the backups would be identical because all the data on all ten disk drives would be identical.

On January $2^{nd}$, ten users have received emails, installed some games, downloaded some pictures of each person's family, etc. In other words, the users have personalized their particular computer.

Now consider the optimal strategy for creating ten new Chapters representing each of these ten machines.

Under the conditions specified, above, it would not make sense to add DEDs to the DDS from new Output Packets because we wish to bias the DDS to have the DEDs from the base Reference File. The reason for this is that new Output Packets will have data from different users and it is extremely unlikely that the pictures of one user's family would be identical to pictures from another user's family.

By replacing the DEDs under this situation, we would have fewer DEDs pointing to identical data and thus deduplication efficiency would be reduced.

On the other hand, if instead of ten Current Files representing different users, we have ten current files representing Image Backups of ten consecutive days of the same user, then we would want to bias the DDS to represent newer data so that newer data from more recent would be more likely to be deduplicated.

XXXIV. INTRAFILE DEDUPLICATION

Nearly anyone familiar with computers is familiar with zip files. Zip compression will take a single file and compress the file and will, generally, produce a smaller output file than the input. As those who are familiar with the art are fully aware, there are innumerable compressors know with various speed and compression characteristics. Well known are ARC, LZW, ARJ, RAR as well as many others.

Our Method can also perform intrafile compression for all chapters by making the initial Reference file a zero length file (aside from the chapter packet) and using an Extended Reference File DED Storage Strategy (ERFDSS) that is biased towards adding DEDs from the Current File.

Indeed, one could modify the Preferred Embodiment such that the DDS is cleared and the DDS is then populated using the Current File rather than the Reference File.

XXXV. ITERATING THE METHOD; CREATING MULTIPLE CHAPTERS (ENGLISH)

An obvious extension of the Method that we shall claim is to use the Extended Reference File (ERF) created by this method to become one of the inputs to the next iteration. That is, for example, if on Tuesday there exists the Monday Reference File and the Tuesday Current File and on Tuesday evening a Tuesday ERF is created then on Wednesday we can use the Tuesday ERF as Wednesday's Reference File. On Wednesday night, therefore, the Wednesday ERF would contain sufficient information to recreate any or all of Monday's Reference File, Tuesday's Current File, Tuesday's Reference File, Wednesday's Current File, and, of course, Wednesday's ERF.

We define Chapter to mean the collection of data necessary to logically or physically recreate the state of the Repository at a point in time. Thus, for the example in the previous paragraph, there would be three Chapters. The decorated Monday Reference File represents the first Chapter. The Tuesday ERF represents the second Chapter. The Wednesday ERF represents the Third Chapter This obvious extension has some non-obvious implications for how the Method is to be adjusted to increase the probability that duplicate data is found. Specifically, there are several strategies that might be used to increase the probability that duplicate data is found and thus reduce the size of the ERF.

In the current implementation of the Preferred Embodiment, the implementation appends the data for each Chapter to the end of the previous Extended Reference File. When the next Chapter is to be created, the implementation reads the data added in the previous Chapter and adds the hash codes from that data to the DDS (i.e. in the Preferred Embodiment, the hash table). By doing this, the data from all the Chapters has some probability of being in the DDS.

Clearly, there are a variety of strategies that can be used to store and update the DDS. Those familiar with the art recognize that the DDS may be saved in a separate file. The DDS may be continue to be updated by using data from newer Chapters and biasing that toward the new DED's in the manners described in, for example, Section (3.5).

We teach that it may be better to reduce the probability of later data overwriting earlier data so that data from all chapters has more-or-less an equal probability of appearing in the DDS.

We refer the reader to Exhibit 10 for a sample structure of a File with five Chapters. While Exhibit 10 refers to a File, this structure is trivially converted to a byte-oriented file.

XXXVI. EXAMPLE CASES

XXXVI.(1) Worst Case.

As those familiar with the art of compression know, no compression technique is guaranteed to produce compression. Indeed, under worst-case conditions, every compression technique is guaranteed to produce output that is larger than its inputs.

Our Method is no exception and it is useful to understand this Method's limitations.

The amount of compression that one is likely to get from our Method is, on average, dependent on the size of the DDS; the larger the DDS the more likely it is that our Method will be able to detect and eliminate common data redundancy.

Consider a DDS with zero entries. The Method will proceed, roughly, as follows:

A pointless "Reference File Analysis Phase" would be done to build a non-existent DDS. As usual, the Reference File would be physically and/or logically copied to the Extended Reference File while digests are inserted into the DDS. Since the DDS has, by our example, no entries then the computation of digests is also pointless.

Once the Reference File Analysis Phase is complete the Method proceeds to the Current File Redundancy Elimination Phase (CFREP) in which the Method searches (via the non-existent DDS) the Reference File for duplicate data.

In the degenerate case of the Preferred Embodiment, a B-byte-block is brought in from beginning (byte position zero) of the Current File. Digests are built for every n-byte block in the B-byte-block and the non-existent DDS is searched for matching hash codes. By definition, no hash codes will match and thus a decorated B-byte-block whose length is b-bytes plus the size of the decoration will be transmitted to the Extended Reference File.

The computations of the paragraph immediately above will be repeated for each B-byte-block in the Current file.

If the user did not use our Method but merely kept the Reference and Current files, the total number of bytes consumed would, obviously, be the sum of the file lengths of the Reference and Current Files.

In this, our worst-case scenario, the number of bytes used will be the sum of the file lengths of the Reference and Current Files plus the number of bytes for the decoration of the Reference file plus the number of bytes for decorations of each B-byte-block of the Current File.

Thus the number of bytes that would exceed the number of bytes used if the user did not use our Method will be the number of bytes for the decoration of the Reference file plus the number of bytes for decorations of each B-byte-block of the Current File.

XXXVI.(2) Other Examples

XXXVI.(2)(A) Identical Files with DDS Containing One Entry and Only Using One Pass through the Current File The next example will show a claimed improvement on the Method by using multiple passes through the Current file.

In this example we assume that the DDS contains a single entry and that the entry represents a position in the middle of the identical Reference and Current Files.

In this, a single-pass version of the Method, the process proceeds just as it does in the example explained in [XXXVI.(1) Worst case] up until the middle of the Current file.

As can be seen immediately, half of the Current File (with additional bytes for decorations) will be written to the Extended Reference File. By definition, a B-byte-block is brought in and the only hash match is found, then the program implementing the Method could run backwards from the middle position and detect that from the beginning of the two files to the middle position and then to the end of the two files that the two files match completely.

Indeed, it is possible for a variant of this Method to "unwrite" the decorated first half and replace this with a decorated pointer and a length.

This may be less than optimal under those circumstances where the Extended Reference File is being written to a WORM-like device. This will waste WORM memory.

In the case where the data is being written to a WORM, writing data that may later be "unwritten" may exceed the device's capacity.

XXXVI. (2)(A) Identical Files with DDS Containing One Entry and Using Multiple Passes through the Current File.

Where compression is more important than time, the user of a program implementing this method might select a variant that has one or more additional passes over the Current File.

In this variant, we modify the DED in Exhibit 16

---

Exhibit 16 unsigned LowerHashValue;
unsigned BlockNumberInReferenceFile;
longlong GoodHashValue;
longlong BlockNumberInCurrentFile;

---

By adding the field BlockNumberInCurrentFile and filling in this value in a pass over the Current File, the Method can be modified to jump to the position specified in BlockNumberInCurrentFile and work backwards through the file looking for identical runs of data until a non-match is found.

In the case of two identical files and a single entry in the DDS as described, above, it should be apparent that this modification would allow the Method to detect that the Reference and Current Files are identical and only require the addition of a few bytes to the end of the copied Reference File to indicate that fact.

Thus this variant of the Method would be quite appropriate to minimize the unnecessary writing of identical data.

XXXVII. IMPLEMENTATION AS A STAND ALONE APPLIANCE

Instead of having the client computer use idle cycles to remove the redundancies as we have illustrated in our Method, it might be more efficacious to have a stand-alone appliance perform the redundancy removal. That is, the client computer (or, equivalently, the Appliance) copies the contents of the client computer's Repository to the Appliance and then the Appliance performs the redundancy removal as well as additional functions to be described below. This variation of the Method has at least the following advantages.

The first obvious advantage is that the client computer need not devote computer cycles to the task of removing the redundancies. As is apparent to those familiar with the art, copying the contents of the Repository to an Appliance may well take less time than performing the Method on the client computer.

The second non-obvious advantage is that the Appliance could transmit the Reference File as well as the Delta Files to an offsite location thus guaranteeing that the user can restore the user's data should a local disaster to the client computer happen.

The third non-obvious advantage is that the Appliance could be attached to a multiplicity of Client computers. A user selectable option could be to store only a single Reference File or a multiplicity of Reference Files depending on how closely the data among and between the computers is similar.

Of course, an obvious extension to this would be to allow the user of the Appliance to select which Client computers share the same Reference File. Another obvious extension is to allow the Appliance to select which of a multiplicity of Reference Files should be used to become the Reference File for a particular Client computer. These variations on the Method will also be claimed.

The Appliance can also be programmed so that data in older Chapters cannot be modified. That is, the Appliance could become a variation of the Write Once Read Many (WORM) drive. This, too, will be claimed.

A fourth non-obvious advantage is that a separate appliance can have custom hardware to make the redundancy elimination both faster and more secure.

In terms of speed, it would make sense, for instance, to include custom hardware in the appliance to compute hash codes.

In terms of security, it would be trivial to include custom code or custom hardware in the Appliances firmware that would force the Appliance into a mode in which areas of its repository are semi-permanently or permanently prevented from being rewritten. This, too, will be claimed.

As anyone who understands our Method should by now understand, there is no reason to ever rewrite areas of the Extended Reference File; rather, all changes to the Extended Reference File can be made by appending to the end of the file. This makes it less likely that existing data will be corrupted by subsequent changes, especially if the firmware or hardware can enforce this restriction, as mentioned in the previous paragraph. Thus our Method is ideal for archiving large numbers of versions of a Client Computer's Repository.

It is an obvious extension of the Method to encrypt the data stored in the Appliance. It is an obvious extension of the Method to encrypt the Reference (or a copy of the Reference), Current, and Output Files whether or not they reside in an Appliance.

XXXVIII. IMPLEMENTATION AS A FILE SYSTEM

Because the Method may capture the state of a Repository at one or more points in time, it should be obvious to those familiar with the art that an Appliance or, equivalently, a so-called device driver can present the collection of Reference and Patch Files as a File System such as FAT or NTFS.

There are variations on this extension to the Method.

XXXVIII.(1) The Method Presented as File Systems.

As those familiar with art of file system drivers know, one can simulate a physical disk via software and present to the appropriate level of an operating system a simulation of that simulation so that a simulated file system becomes indistinguishable from a real physical device to upper levels of the operating system software.

As those familiar with the art understand, a physical disk can contain several file systems. For instance, a physical disk can be partitioned into NTFS and FAT file systems. Because our Method can capture and later recreate an entire physical disk at several points in time, one can immediately see that several file systems can be restored at once. Similarly, operating systems like Windows can perform a so-called "mounting of a file system" operation for one or more partitions (that is, file systems) on a particular physical disk. Because a physical disk can be simulated in software, one can mount the one or more file systems using the simulation. Those familiar with the art know this as "mounting a disk in a file" or "mounting a virtual disk."

If one iterates the Method as we describe in XXXV, then our method can present each Chapter as a disk in-a-file to which the operating system can then mount the various file systems. Those familiar with the art are familiar with the innumerable ways that such a collection of Chapters could be presented to a user in order for the user to select one or more Chapters for mounting as virtual disks.

As those who understand the nature of the Method understand, in order for Chapters to be recreated successfully, the data that is in a Chapter must not be modified. If the data in the Reference File or the various Patch Files is accidentally or maliciously modified then there is a substantial probability that all data in all Chapters will be corrupted.

Thus stored Chapters are read-only. Nonetheless, a Chapter can be mounted as a collection of one or more File Systems in one of two ways: read-only or writeable. If mounted as read-only then the operating system will reject any attempt to write to the Chapter.

Writeable Chapters can come in one of two variants. The first variant allows all writes and any new data creates a new Chapter. The second variant allows any new data to be written but all new data is discarded.

XXXVIII.(2) The Appliance as a File System

If one connects Apple's iPod(™) to a Windows(™) computer, those familiar with the art will see the iPod presented to the Windows operating system as a file system.

Similarly, we teach that it would simple for those familiar with the art to use a similar interface to present the Appliance as if the various Chapters were separate File Systems.

As anyone familiar with the art should readily understand, there are a multitude of possible user interfaces that would allow a user to select one or more Chapters.

One simple user interface would be nothing more than an up-and-down button as well as an alphanumeric display allowing the user to select an existing Chapter.

Another possibility is for there to be a command channel controlled by the user's computer or other device external to the Appliance that would allow the user to set a wealth of options in the Appliance. One of those options could be which Chapter to present to the user's computer as the mountable virtual disk.

XXXIX SIMPLIFIED DESCRIPTION OF THE METHOD AS IMPLEMENTED AND ILLUSTRATED IN THE PREFERRED EMBODIMENT.

(1) The Reference File is logically broken up into n-byte (e.g. 256-byte) sections. If the Reference File is a megabyte (1,048,576 bytes) then there will be 4096 256-byte sections. That is, in this case, NN would be 4096.

(2) The number of entries that can be stored in the DDS is computed and the number of n-byte blocks is computed. Then the Subscription Ratio (SR) can be computed which is roughly the number of n-byte sections (NN) divided by the number of slots available in an empty DDS.

(3) DDS population: There are various strategies to populate the DDS. All the strategies will fill (or mostly fill) the DDS and have in common the fact that there are more hash keys and values to insert (NN) than there is room in the DDS (DDSMHC). On average, once every SR n-byte sections, the Database Mapping Engine inserts a computationally expensive CRC64 as well as a computationally inexpensive Rolling Hash into the DDS.

In the Preferred Embodiment, when a Chapter is closed, the DDS is stored in a separate file. This file can be read in order to load the DDS for the new Chapter being created.

(3.1) In the Preferred Embodiment in which there is no Good Hash computing specialized hardware, the Database Mapping Engine is implemented as a hash table. The fields of the hash table comprise a Rolling Hash as well as a Good Hash. The values associated with the keys are as described in XXXIII.(4).

(3.2) As implemented in the Preferred Embodiment, SR is set to 1 so that the CRC64 and the Rolling Hash are computed for each n-byte block. In our example, 4096 entries are inserted into the hash table. If the slot in the hash table is occupied, it is overwritten thus biasing the hash table to contain later entries. This is just one of many strategies to populate the DDS with a subset of the available hash codes.

(3.3) Another example of a possible strategy to populate the DDS would be to insert every SRth entry into the DDS.

(3.4) Another example of a possible strategy to populate the DDS would be to use a random number generator to select on average an insertion once every SRth entry.

(3.5) Another example of a possible strategy to populate the DDS would be to use a random number generator to select on average an insertion once every (SR−x)th entry where x is some "biasing value" so that the DDS is biased towards entries at the beginning, middle, or end; perhaps depending on a User Option.

(3.6) Should the computer in question have specialized hardware to rapidly compute Good Hashes, it then becomes unnecessary for the Method to compute and/or store the Rolling Hash into the DDS since the Good Hash can be used anywhere in this method that a Rolling Hash can be used. In effect, the Rolling Hash is a computational proxy for a Good Hash but because of a Rolling Hash's poor statistical properties, the Method will compute a Good Hash when appropriate as described, below.

(4) Having populated the DDS using the Extended Reference File, the Preferred Embodiment then proceeds to the next phase and begins reading in the Current File in chunks of BN bytes. BN need not be fixed nor do the blocks have to be read in sequential order although this is the most natural choice.

(4.1) Where the computation of the Good Hash is computationally expensive and/or no specialized hardware to compute a Good Hash is available:

(4.2.1) The Preferred Embodiment will compute a Rolling Hash of length N-byte (e.g. 256 bytes) for all BN−N-Byte+1 (e.g. 256K−256+1=261889) overlapping blocks in the B-block.

(4.3.2) If the Rolling Hash matches any Rolling hash in the DDS then a the Preferred Embodiment will select one of several strategies—typically via a User Option—to determine if a (computationally expensive) Good Hash is to be computed.

(4.4.2.1) The simplest strategy is to simply compute a Good Hash once any Rolling Hash matches.

(4.5.2.2) Because Good Hashes may be very computationally expensive, an alternate and clever alternative is to continue computing Rolling Hashes further into the Current File. If two or more Rolling Hash matches are found in the right sequence and at the right distances to correspond to a run of blocks in the Reference File, then a Good Hash is computed for one or more of the corresponding Rolling Hashes.

(4.6.3) Once the Good Hash(es) has/have been computed, an attempt is made to find the Good Hash(es) in the DDS in the following manner. We know that there is a Rolling Hash match. The Good Hash computed for the Current file is compared to the Good Hash in the DED corresponding to the Rolling Hash.

(5) If the Good Hashes match then a block of data is fetched from the Reference File. In the Preferred Embodiment, this block is of size N but virtually any size block would be usable as long as the block contained the n-byte-block of the corresponding Good Hash.

(6) Having brought in the Reference File block, the Method now searches backwards and forwards for matching byte patterns by performing an Expanding-The-Run operation. An Expanding-The-Run operation may require additional I/O operations in order to compare bytes in the Extended Reference File and the Current File. We teach that the matching patterns do not have to be exact. Those familiar with the art are fully familiar with so-called binary-difference algorithms that can emit difference data for two binary patterns that are similar. See Section XXI. In the Preferred Embodiment, the program stops at the first mismatching byte in each direction of search.

(7) Having detected a Expanded Run, the information regarding the run—and thus the data duplication elimination information—is emitted to the Extended Reference File as a Matching Data Packet. At a User Option, the Method and the corresponding implementation may adjust previous entries in the Extended Reference File to indicate that previously stored unique data is now part of a Run.

(8) If no Run is found, the decorated unique data is emitted to the Output File as a Literal Data Packet (LDP).

XL ANALYZE AND POTENTIALLY MODIFY THE EXTENDED REFERENCE FILE TO REMOVE INTERNAL REDUNDANCY

In the Preferred Embodiment, the base Reference File is analyzed to remove internal redundancies. In a previous implementation of the Preferred Embodiment the Reference File was not analyzed to remove the non-local redundancies. As is obvious to anyone familiar with the art, whether or not the base Reference File is scanned for redundancies could easily be made into a User Option.

XLI. ADDING THE DATA FROM THE CURRENT FILE (I.E. CHAPTER) TO THE DDS DURING AN ANALYSIS

In the Preferred Embodiment, the DDS of the Extended Reference File is kept in RAM until it is written out after the analysis of the Current File. In the Preferred Embodiment, the DDS is stored in a separate file. Equivalently, the DDS may be stored as part of the Extended Reference File.

XLII USING VARIABLE LENGTH N-BYTE-BLOCKS

XLII.1 Overview

In this entire specification we have assumed that n-byte-blocks all have the same size, namely, N-bytes. This need not be the case.

As those familiar with the art will readily understand, each block of data for which a DED is created need not be the same length.

The motivation for having variable-length-n-byte-blocks (VLNBBs) might be, for instance, that the user knows that the data at the beginning of a Current File has many small duplicate blocks that would not be detected with a large N-byte value but that the data at the end of the Current File has long Runs.

Thus the user could set a User Option that would
1. set the size of N-bytes from 512 bytes at the beginning of the Reference File Analysis Phase (RFAP) as the Extended Reference File is processed, and then
2. set the size of N-bytes to 8K when, say, half the Extended Reference File has is processed.

As should be obvious to those familiar with the art, fixed length n-byte-blocks are a special case of variable length n-byte-blocks XLII.2 Creating Variable Length N-Byte-Blocks in the Reference File Analysis Phase (RFAP)

Having VLNBBs adds a bit of complication. Somehow the length of the block would have to be stored in the DED or the DDS.

For instance, one possible strategy might be to have two DDS's. One DDS would have DEDs that have N-bytes equal to 512 while the other has N-bytes equal to 8K.

In the alternative, one could implement a DDS in which every DED has the associated "n-byte-block length" as a field.

XLII.3 Handling VLNBBs During the Current File Redundancy Elimination Phase (CFREP)

Using variable length n-byte-blocks also creates additional complexity to the CFREP, Conceptually (but not in actuality), in the Preferred Embodiment, at each byte of the Current File, a hash code is computed for the n-byte-block starting at said byte.

That is, for instance, if N-bytes is 512 then at byte position 100 in the Current File, a hash code for bytes 100 through 611 would be computed and the hash code so developed would be the key by which the DDS would be searched for a matching hash value.

In the Preferred Embodiment, the size of N-bytes is fixed and thus no special handing for variable length blocks would be needed.

XLII.4 Creating the Variable-Length-N-Byte-Block-Length-Table (VLNBBLT)

In the variant where N-bytes might be variable length, the Current File Redundancy Elimination Phase (CFREP) would need to know all the possible values of N-bytes.

On way to do this is to keep a table of the unique values of N-bytes as the DDS is being developed. In our example above, such a table would have two entries: 512 and 8K. We call this table the variable-length-n-byte-block-length-table (VLNBBLT).

Another way to create the VLNBBLT is to scan the DDS for all possible unique values of N-bytes.

XLII.5 Using the Variable-Length-N-Byte-Block-Length-Table (VLNBBLT)

For the purposes of this discussion, let us assume that only two unique values of N-Bytes are in use.

Thus at byte position 100 in the Current File, two hash code values would be developed:
1. A hash code for the 512-byte block of bytes 100 through 611, and
2. A hash code for the 8 k block of bytes 100 through 8291

Each of these two hash codes would be used as a key to search the DDS. If one of more hash code matches were found then the Method would proceed identically to the process described many times, above (e.g. section XXX), in which the block of data pointed to in the DED is compared to the block of data in the Current File and if there is a match then an Expanding-The-Run operation is performed, etc.

XLIII USING HIGH PERFORMANCE CACHES BY USING A DED ACCESS ACCELERATOR

As those familiar with the art know, locality of reference can make software run dramatically faster on certain kinds of hardware.

As we have taught in X, access to disk memory can be a million times slower than access to RAM. Similarly, access to the RAM Memory Hardware Cache (RMHC) (e.g. the L2 cache) can be many times faster than access to RAM. Thus, if data that is often and repeatedly accessed can be kept in the RMHC then the Method can be made to run faster.

In the Preferred Embodiment, if the ERF and the Current File share little duplicate data then roughly one Rolling Hash is computed for each byte of the Current File. For each Rolling Hash computed, the DDS is searched for a DED with a matching hash value. In one implementation of the Preferred Embodiment, this is accomplished by comprising the following steps
1. Convert the Rolling Hash value to a hash index by using the bottom 21 bits of the hash value as the hash index (thus producing an index value between 0 and 2,097,151).
2. Using the hash index to point into the hash table of DEDs.
3. Comparing the Rolling Hash calculated from the Current File for equality with the Rolling Hash field stored in the DED pointed to in the previous step.

Analysis of the implementation of the Preferred Embodiment shows that a large fraction of the execution time of the program is spent in the hash table lookup as described in the previous paragraph.

It is well known to those conversant with the art that hash coded accesses to memory exhibit very poor locality of reference. That is, it is in the nature of hash codes that given random data to hash that the hash index derived from the hash code will be, effectively, a random number.

For a Current File that has few matches in the ERF, this results in an effectively random memory access for nearly every byte in the Current File.

Assuming that the Current File is billions of bytes long, then in the implementation of the Preferred Embodiment, experiment shows that this approach causes the performance of the implementation to be limited by the time taken by these billions of random accesses to main memory, which prevents efficient use of processor resources.

We would expect to see a dramatic improvement in performance of the Preferred Embodiment if the entire DDS could be stored in, say, the L2 cache. But the DDS is, generally, many times larger than the L2 cache on modern (2009) workstation computers.

The Inventors have devised a method by which many of these random accesses to RAM can be avoided by, instead, accessing the data in the much faster RAM Memory Hardware Cache (RMHC) by creating and using a data structure which we call a DED Access Accelerator (DAA).

In the Preferred Embodiment, what the Inventors did is to create a one-byte Proxy for each DED in the DDS. This array of Proxies is the DAA.

In the preferred embodiment, the one-byte Proxy is the low order byte of the Rolling Hash stored in the DED. It could, of course, be some other collection of bits of the Rolling Hash but a single byte is convenient. A nybble (4 bits) is another obvious size for a Proxy.

Whenever the main hash table (DDS) is loaded into memory or is updated in the course of operation of the Method, this DAA is populated with the one-byte Proxy of the Rolling Hash stored in the corresponding entries in the DDS. If the Proxy in the DAA entry does not match the corresponding Proxy of the Rolling Hash calculated for a particular position in the b-byte block, it is not necessary to access the corresponding DDS entry, as the whole Rolling Hash cannot match if the Proxy for the Rolling Hash does not match.

The DAA and the DDS must be kept in sync. Thus, when the DDS is updated, the DAA is updated as well.

The performance gain comes from the fact that so long as the DM is small enough to fit in the RMHC, (e.g. the L2 cache used by many modern processors to hold recently-used portions of memory), accessing the DAA is many times as fast as accessing random locations in main memory. We can predict that most of the DAA will remain in the L2 cache because entries in the DM are being accessed far more frequently than any other data in the inner loop of the program.

As those familiar with the art will realize, and assuming that the DAA cannot explicitly be locked into the RMHC, such an approach will work optimally only if there is (at least) one entry in the DAA for each entry in the DDS; if that relationship does not obtain, then the DDS will have to be accessed for those DDS entries that do not have an DM entry, thus negating the effectiveness of this Method to avoid such accesses. This limitation arises from the fact that frequent accesses to entries in the DDS will cause the memory locations representing those DDS entries to replace DAA entries in the RMHC.

However, this requirement imposes a limitation on the size of the DDS. For example, if each Proxy in the DM is one byte of the corresponding DDS Rolling Hash entry, then the number of DDS entries cannot exceed the number of bytes in the RMHC (e.g. L2 cache, typically 1-4 MB in circa 2009 commodity computers). If DAA entries are smaller than one byte, then this limitation can be relaxed correspondingly, but in order to have a reasonable reduction in random accesses to main memory RAM, the subset of the Rolling Hash stored in the DM must be at least a few bits. With a one-byte DM entry, on the average only 1 in 256 DDS entries must be accessed (because the one byte subset of the Rolling Hash in the DAA will have a "false match" to the corresponding Proxy in the calculated Rolling Hash with that frequency, on average). With a 4-bit DAA Proxy, 1 in 16 DDS entries will need to be accessed, and of course with a 1-bit DM Proxy, 1 in 2-DDS entries will need to be accessed, eliminating most of the performance gain from this method.

The applicability of this way of improving performance thus depends to a large extent on the fact that there are not too many DDS entries for a corresponding DAA (with reasonably sized entries) to fit in the RMHC.

In the Preferred Embodiment, to use this approach we limit the number of entries in the DDS to 2,048,576 and set the DAA entry size to one byte, so that the whole DAA occupies that same number of bytes, most of which will reside in the L2 cache on a computer with at least 2 MB of L2 cache. With a 2048 byte n-byte block, a 256K b-byte block, and an oversubscription ratio of 50-1, this provides good deduplication performance for files of sizes up to approximately 200 GB.

It is worth noting that the performance implications of random access to RAM are not trivial; in the Preferred Embodiment, the observed increase in overall throughput is up to 50% for 32-bit code and approximately 150% for 64-bit code. The Inventors have occasionally observed performance throughput increases of over 200% compared to the Method not using the DM.

However, deduplication approaches that do not use oversubscription cannot use this approach fruitfully because they cannot limit the number of entries in the DDS to nearly the extent that the Method can. For instance, with the same parameters as above but a subscription ratio of 1-1 rather than 50-1, a deduplication implementation would be limited to a 4 GB file rather than a 200 GB file, which would greatly limit its applicability in commerce. So in the real world, it is not possible to achieve the performance gains that this optimization confers without using oversubscription as claimed in the Inventors' Method.

As those who are familiar with the Art can see, this technique is not limited to data deduplication but to any time that a database (e.g. table) needs to be searched for a matching value and in which the array of Proxies for the elements in the database can fit into a RAM cache (e.g. L2 cache).

Let us give a contrived example of how this could be used in an environment that is not a data deduplication environment.

Let us say that we have a customer database of 500,000 customers in which the fields comprise 1. Social Security Number
2. Customer Name
3. Customer Name Hash
4. Address Thus the DED comprises the fields, above.

The DDS is the collection of DEDs and is implemented as a hash table. The hash table is indexed by converting the Customer Name Hash into a Hash Index. Further assume that there are no hash table collisions in the DDS which can store up to 2 million entries. It is feasible to assume this lack of collisions as an approximation, since there is an undersubscription of 4:1.

From the Customer Name hash, we extract a one-byte Proxy and store this proxy into the DAA at the Hash Index position.

And let us say that we also have a list of a billion customer names and wish to determine which of these billion names exist in this database of 500,000 customers.

For each of the billion customer names, a customer name hash is developed. From the customer name hash, a hash index is developed. From the customer name hash, a Proxy is developed.

The DAA which, presumably, is now in the RAM Memory Hardware Cache (RMHC), e.g., the L2 cache, is indexed via the Hash Index. The Proxy at the Hash Index position in the DAA is fetched and compared to the Proxy developed from the name in the list of a billion names. If the two proxies do not match then the name does not exist in the DDS of 500,000 customers.

It the proxies do match, then the implementer could compare Customer Name Hashes or go directly to comparing customer names by a string compare as the implementor sees fit.

By keeping the DAA in the RMHC significant performance gains can be achieved.

Certain RMHC implementations respond to software commands to keep certain data semi-permanently locked in the RMHC. Thus, in one implementation of the Method, one could use such software commands to semi-permanently lock the DAA into an RMHC implemented as an L2 cache.

We now explain Diagram 1.

When a hash table is large, frequent random accesses to it can cause significant performance degradation due to the lack of locality of reference. To mitigate this problem, it is possible to use a DAA. Here is a diagram of how this could work, assuming we have a hash table composed of entries each with the following content, and which are indexed by the Rolling Hash value:

| Name | Length | Description |
| --- | --- | --- |
| Good Hash | 8 bytes | Hash code with good statistical properties |
| Rolling Hash | 4 bytes | Hash code that is easy to compute |
| Block Number | 4 bytes | Block number in ERF to which this entry refers |

If we have 2^21 (approximately 2 million) entries in this hash table, and each entry occupies 16 bytes, then the total storage required for the table is approximately 32 Megabytes, which is considerably larger than the L2 cache in most commodity workstation computers circa 2009. Thus, the poor locality of reference of hash accesses will cause many references to main memory with the associated performance degradation.

DAA mitigates this problem by taking a subset of the index (one byte of the Rolling Hash value, in this case), the Proxy, and copying it to an array that will fit in the L2 cache, here assumed to be at least 2 MB in size.

See Diagram 1. All of the values are in hexadecimal for convenience in showing byte boundaries:

XLIV IMPROVEMENT IN THE STORAGE OF HASH CODES INTO A HASH TABLE

We now teach a Method for improving the storage of hashes into a hash table. Those familiar with the art will understand that the values in the example, below, are illustrative rather than specific.

For the method to work, the hash table must have a number of entries that is a power of 2; for example, 2**24 (=16777216) entries. Clearly, the hash table might have, say 16777219 entries, but then three of the entries would be unneeded by the Method we teach.

By using some arbitrary-but-consistent 24 bits of the hash code as the index into the hash table and then storing the rest of the hash code in the hash table, those 24 bits need not be stored, thus saving nearly half the 64 bits of the hash code.

For instance, if the hash code is 64 bits, and the hash table is 2**24 in size, then we can recover 24 bits of the hash code by simply noting the hash's position in the hash table.

As a practical matter in order to maintain alignment in RAM, what would likely be done is that 32 bits of the hash code would be stored in one of the 2**24 positions and the remaining 8 bits of hash code would be thrown away.

Obviously, when comparing hash codes, only 56 bits of the hash code would be compared if only 56 bits could be recovered from the hash table.

Preferred Embodiment (Best Mode): Source Code and Explanation

XLV. OVERVIEW OF THE PURPOSE OF THE SOURCE CODE.

In this section of the specification, the Inventors will teach several optimizations as implemented in the Preferred Embodiment. These optimizations are commented in the source code listings that can be found on the compact disc submitted to the USPTO and we include this material as an incorporation-by-reference.

The source code listings are code fragments extracted from a working implementation of the Method.

It is standard C++ and compiles and executes successfully using Microsoft Visual Studio 2008.

The source code will not compile successfully; but is, instead, to be used to understand how the Method works as implemented in the Preferred Embodiment.

XLVI. DEFINITIONS NEEDED TO UNDERSTAND THE SOURCE CODE

Theoretical Starting Block Number (TSBN): is the block number in the ERF that the beginning of this b-block would match to, if we had a perfect match from this point back to the beginning of the b-block. The TSBN is used in the implementation of the algorithm described in the section entitled "Hash Codes in the right order and at the right distances". The Inventors have coined this phrase.

Sequential Block Map (SBM): is the data structure used to keep track of the Theoretical Starting Block Numbers (TSBNs) and associated data ("strength" of the entry, starting and ending positions in the b-byte block) for a b-byte-block. The Inventors have coined this phrase.

Match Finding Result Map (MFRM): is a map containing one entry for each of the Rolling Hash matches that were found for a specific b-block, together with their respective ERF block numbers and Good Hashes. The Inventors have coined this phrase.

Access Vector: is an object type that acts like a normal C++ vector, except that it doesn't allocate memory. Its purpose is to allow one to use the [ ] notation to access a contiguous subset of elements of a pre-existing array or vector as though it were a vector in itself. The Inventors have coined this phrase but the concept is well understood by those familiar with the art.

XLVII. COMMENTED SOURCE CODE

The flow of the Preferred Embodiment when adding a Current File to the ERF (and ignoring edge cases and some optimizations for simplicity) is as follows:

A. The main program calls a function named FindMatchingSegmentsAndAddThemToArchive B. This function reads in each b-byte-block from the Current File, then calls a function named FindAllMatchesinProcessingBlock. This function executes the following algorithm:

1. For each element in the b-byte block that can start an overlapping n-byte block, the function sets the value "i" to the location in the b-byte block where such a n-byte block begins.
2. For each such value of "i":
   a. This function examines the overlapping n-byte blocks in the b-byte block, one at a time, and calculates a Rolling Hash for each such block.
   b. It then calculates the index that the Rolling Hash corresponds to in the DAA and the DED.
   c. It then checks that entry in the DAA to see if the Proxy for the Rolling Hash it has just calculated matches the Proxy for the corresponding DED entry. If not, then it concludes that it does not have to access the DED, so it skips all the steps up to but not including the Rolling Hash update.
   d. If the Proxies do match, it then retrieves the DED entry that has that index.
   e. If that entry has been initialized with an ERF block number and Good Hash, it retrieves those values from that entry.
   f. It then calculates a Theoretical Starting Block Number (TSBN) for this location in the b-byte-block.
   g. Then it looks in the Sequential Block Map (SBM) to see if there is an entry in that Map corresponding to this TSBN.

h. If not, it creates such an entry, containing the TSBN, an initial "strength" of 0, and the current value of "i" as both starting and ending offset values.
i. If there already is such an entry, the code increments the "strength" of this SBM entry and updates its ending location to the current value of "i".
j. Then the function adds an entry to the Match Finding Result Map, which is an associative array keyed by the value "i". Each entry in this map contains the ERF n-block number and the Good Hash that was retrieved from the DED for position "i" in the b-byte-block.
k. Finally, the Rolling Hash is updated to the Rolling Hash value corresponding to the overlapping n-byte block (that is, the n-byte block starting with the next value of "i").

3. Use the SBM to remove unnecessary and/or inefficient short Runs.
4. Return the MFRM to the calling function.

C. The function FindMatchingSegmentsAndAddThemToArchive continues by calling a function called ProcessPossibleMatches. This function executes the following algorithm:

for each overlapping n-byte block in the current b-byte block:
1. For each element in the b-byte block that can start an overlapping n-byte block, the function sets the value "i" to the location in the b-byte block where such a n-byte block begins.
2. For each such value of "i":
   a. See if we have a Run of zeroes. If so, process it and continue.
   b. Otherwise, look in the MFRM to see if we have an entry for this value of "i".
   c. If so, then calculate a Good Hash for the n-byte block at position "i" in the b-byte block.
   d. If this matches the Good Hash found in the MFRM entry, then call a function called MatchOnlyWhatWeNeedTo. This function reads data from the ERF and Extends the Run as far as possible in both directions in the ERF and returns the starting and ending positions of that Run, or an indication of a "false match" if no Run is found.
   e. If the return value from MatchOnlyWhatWeNeedTo indicates that we have found a Run, we call ProcessUsableMatches to emit a Matching Packet corresponding to that Extended Run.
   f. Finally, after control returns from ProcessUsableMatch, ProcessPossibleMatches adjusts the value of "i" to skip over the segment of the b-byte block that has been accounted for by ProcessUsableMatch.

XLVII.1 FindMatchingSegmentsAndAddThemToArchive( )

Referenced, below, we find the relevant section of the function that finds matching Runs of data and adds them to the ERF (e.g. the "Archive").

This listing can be found on the compact disc submitted to the USPTO and we include this material as an incorporation-by-reference:

| Exhibit 17 | |
|---|---|
| File: | FindMatchingSegmentsAndAddThemToArchive.txt |
| Creation date: | Jun. 08, 2009 |
| Size: | 2017 |

XLVII.2 FindAllMatchesinProcessingBlock( )

Referenced, below, is the relevant section of the function that finds Rolling Hash matches in the Current File b-byte buffer:

This listing can be found on the compact disc submitted to the USPTO and we include this material as an incorporation-by-reference:

| Exhibit 18 | |
|---|---|
| File: | FindAllMatchesInProcessingBlock.txt |
| Creation date: | Jun. 08, 2009 |
| Size: | 4833 |

XLVII.3 ProcessPossibleMatches( )

Referenced, below, is the code for the function that determines which Rolling Hash matches should be looked up in the ERF. Note that the return value from this function is not currently used.

This listing can be found on the compact disc submitted to the USPTO and we include this material as an incorporation-by-reference:

| File: | ProcessPossibleMatches.txt |
|---|---|
| Creation date: | Jun. 08, 2009 |
| Size: | 4679 |

XLVII.4 MatchOnlyWhatWeNeedTo( )

Referenced, below, is the code for the function that generates the largest match possible:

This listing can be found on the compact disc submitted to the USPTO and we include this material as an incorporation-by-reference:

| Exhibit 19 | |
|---|---|
| File: | MatchOnlyWhatWeNeedTo.txt |
| Creation date: | Jun. 08, 2009 |
| Size: | 3780 |

Although this invention has been described with respect to specific embodiments, it is not intended to be limited thereto, and various modifications which will become apparent to the person of ordinary skill in the art are intended to fall within the spirit and scope of the invention as described herein, taken in conjunction with the accompanying appended claims.

What is claimed is:

1. A method of reducing redundancy between two or more data sets comprising:
   accessing a reference file comprising at least a plurality of data blocks, wherein the plurality of data blocks are hashed to identify duplicate data;
   creating an oversubscribed hash table comprising a plurality of hash entries, wherein the oversubscribed hash table is oversubscribed based on the plurality of data blocks in the reference file by at least an oversubscribed ratio of 10:1 wherein for at least every 10 data blocks in the reference file there is a single hash entry in the hash table;
   computing hash codes for the plurality of data blocks in the reference file and storing a subset of the hash codes in the hash entries in the oversubscribed hash table;
   accessing a current file comprising at least a plurality of data blocks;

computing hash codes for a plurality of data blocks in the current file and comparing the hash codes associated with the current file to the hash entries in the oversubscribed hash table;

identifying a first pair of matching hash codes where a first hash code of one of the data blocks in the current file matches a first hash code in one of the hash entries in the oversubscribed hash table;

identifying a second pair of matching hash codes where a second hash code of one of the data blocks in the current file matches a second hash code of one of the hash entries in the oversubscribed hash table; and when the matching hash codes in the first and second pairs of matching hashes have a matching order and distance, comparing the data in the associated blocks of the current file and the reference file to identify a run of matching data in the current and reference files.

2. The method of claim 1, wherein the ratio of the oversubscribed hash table is at least 20:1.

3. The method of claim 1, wherein the ratio of the oversubscribed hash table is at least 30:1.

4. The method of claim 1, wherein when a first hash code associated with a first hash entry in the oversubscribed hash table matches a second hash code associated with a second data block in the reference file, information in the first hash entry about the location of the first data block is overwritten with information about the location of the second data block.

5. The method of claim 1, wherein the hash entries in the oversubscribed hash table are randomly selected from the hash codes associated with the data blocks of the reference file.

6. The method of claim 1, wherein the hash entries in the oversubscribed hash table are selected from the hash codes associated with the data blocks of the reference file based on a user selected option.

7. The method of claim 1 further comprising expanding the run of matching data by comparing preceding blocks in the current and reference files for matching data.

8. The method of claim 1 further comprising expanding the run of matching data by comparing succeeding blocks in the current and reference files for matching data.

9. The method of claim 1 further comprising expanding the run of matching data by comparing preceding and succeeding blocks in the current and reference files for matching data.

10. A system of reducing redundancy between two or more data sets comprising:

computer hardware comprising one or more computer processors configured to access a reference file comprising at least a plurality of data blocks, wherein the plurality of data blocks are hashed to identify duplicate data;

an oversubscribed hash table comprising a plurality of hash entries, wherein the oversubscribed hash table is oversubscribed based on the plurality of data blocks in the reference file by at least an oversubscribed ratio of 10:1 wherein for at least every 10 data blocks in the reference file there is a single hash entry in the hash table;

one or more computer processors configured to compute hash codes for the plurality of data blocks in the reference file and storing a subset of the hash codes in the hash entries in the oversubscribed hash table;

one or more computer processors configured to access a current file comprising at least a plurality of data blocks;

one or more computer processors configured to compute hash codes for a plurality of data blocks in the current file and compare the hash codes associated with the current file to the hash entries in the oversubscribed hash table;

one or more computer processors configured to identify a first pair of matching hash codes where a first hash code of one of the data blocks in the current file matches a first hash code in one of the hash entries in the oversubscribed hash table;

one or more computer processors configured to identify a second pair of matching hash codes where a second hash code of one of the data blocks in the current file matches a second hash code of one of the hash entries in the oversubscribed hash table; and when the matching hash codes in the first and second pairs of matching hashes have a matching order and distance, one or more computer processors are configured to compare the data in the associated blocks of the current file and the reference file to identify a run of matching data in the current and reference files.

11. The system of claim 10, wherein the ratio of the oversubscribed hash table is at least 20:1.

12. The system of claim 10, wherein the ratio of the oversubscribed hash table is at least 30:1.

13. The system of claim 10, wherein when a first hash code associated with a first hash entry in the oversubscribed hash table matches a second hash code associated with a second data block in the reference file, information in the first hash entry about the location of the first data block is overwritten with information about the location of the second data block.

14. The system of claim 10, wherein the hash entries in the oversubscribed hash table are randomly selected from the hash codes associated with the data blocks of the reference file.

15. The system of claim 10, wherein the hash entries in the oversubscribed hash table are selected from the hash codes associated with the data blocks of the reference file based on a user selected option.

16. The system of claim 10 further comprising expanding the run of matching data by comparing preceding blocks in the current and reference files for matching data.

17. The system of claim 10 further comprising expanding the run of matching data by comparing succeeding blocks in the current and reference files for matching data.

18. The system of claim 10 further comprising expanding the run of matching data by comparing preceding and succeeding blocks in the current and reference files for matching data.

* * * * *